(12) United States Patent
Yao et al.

(10) Patent No.: US 11,599,247 B2
(45) Date of Patent: Mar. 7, 2023

(54) INFORMATION PROCESSING APPARATUS AND CONTROL METHOD

(71) Applicant: Lenovo (Singapore) Pte. Ltd., Singapore (SG)

(72) Inventors: Qiang Yao, Kanagawa (JP); Ryohta Nomura, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/554,199

(22) Filed: Dec. 17, 2021

(65) Prior Publication Data

US 2022/0221961 A1 Jul. 14, 2022

(30) Foreign Application Priority Data

Jan. 12, 2021 (JP) .............................. JP2021-003025

(51) Int. Cl.
*G06F 3/0482* (2013.01)
*G06F 3/04817* (2022.01)
(Continued)

(52) U.S. Cl.
CPC .......... *G06F 3/0482* (2013.01); *G06F 1/1616* (2013.01); *G06F 3/03545* (2013.01);
(Continued)

(58) Field of Classification Search
CPC .... G06F 3/0482; G06F 3/0412; G06F 3/0486; G06F 3/04817; G06F 3/03545; G06F 1/1616
See application file for complete search history.

(56) References Cited

U.S. PATENT DOCUMENTS 9,280,261 B2 * 3/2016 Yach .................... G06F 1/1626
9,880,800 B1 * 1/2018 Knepper ............... G06F 3/0482
(Continued)

FOREIGN PATENT DOCUMENTS

JP 2007-109240 A 4/2007
JP 3143445 U 7/2008
(Continued)

OTHER PUBLICATIONS

Extended European Search Report issued in corresponding European Patent Application No. EP 21214574.2 dated Jun. 13, 2022 (20 pages).

*Primary Examiner* — Daeho D Song
(74) *Attorney, Agent, or Firm* — Osha Bergman Watanabe & Burton LLP

(57) ABSTRACT

An information processing apparatus includes a display unit having a plurality of display areas, a touch sensor unit that detects a predetermined operation by an operation medium on one of the plurality of display areas and to detect a position of the operation medium during the predetermined operation, and a startup control unit that displays a menu of icons in the plurality of display areas upon the touch sensor unit sensing the predetermined operation, the menu of icons being different depending on a combination of an orientation of the display unit, and which of the plurality of display areas the predetermined operation occurred in. The startup control unit launches an application program corresponding to an icon selected by the operation medium from among the displayed icons in the menu.

7 Claims, 11 Drawing Sheets

(51) Int. Cl.
*G06F 3/0354* (2013.01)
*G06F 3/041* (2006.01)
*G06F 3/0486* (2013.01)
*G06F 1/16* (2006.01)

(52) U.S. Cl.
CPC .......... *G06F 3/0412* (2013.01); *G06F 3/0486* (2013.01); *G06F 3/04817* (2013.01); *G06F 2200/1632* (2013.01); *G06F 2200/1637* (2013.01)

(56) References Cited

U.S. PATENT DOCUMENTS

| | | | |
|---|---|---|---|
| 10,289,258 B2* | 5/2019 | Lee | G06F 1/1615 |
| 10,969,930 B2* | 4/2021 | Yoden | G06F 3/0482 |
| 2003/0013493 A1* | 1/2003 | Irimajiri | H04M 1/72469 |
| | | | 455/566 |
| 2004/0150674 A1* | 8/2004 | Takahashi | B60K 35/00 |
| | | | 715/810 |
| 2005/0118996 A1* | 6/2005 | Lee | G06F 3/011 |
| | | | 455/418 |
| 2010/0088639 A1* | 4/2010 | Yach | G06F 3/0482 |
| | | | 715/825 |
| 2011/0072373 A1* | 3/2011 | Yuki | G06F 8/34 |
| | | | 715/764 |
| 2012/0284620 A1* | 11/2012 | Yach | G06F 3/04817 |
| | | | 345/651 |
| 2013/0097560 A1* | 4/2013 | Park | G06F 3/0482 |
| | | | 715/811 |
| 2013/0169549 A1* | 7/2013 | Seymour | G06F 3/041 |
| | | | 345/173 |
| 2013/0265250 A1* | 10/2013 | Ishikawa | G06F 3/0488 |
| | | | 345/173 |
| 2014/0152623 A1* | 6/2014 | Lee | G06F 3/03545 |
| | | | 345/175 |
| 2015/0199110 A1* | 7/2015 | Nakazato | G06F 3/0487 |
| | | | 715/763 |
| 2015/0268802 A1* | 9/2015 | Kim | G06F 3/0482 |
| | | | 345/174 |
| 2017/0038917 A1* | 2/2017 | Reicher | G06F 3/03543 |
| 2017/0300205 A1* | 10/2017 | Villa | G06F 3/04842 |
| 2017/0300997 A1* | 10/2017 | Boruhovin | G06Q 20/102 |
| 2020/0264825 A1* | 8/2020 | Itou | G06F 9/451 |

FOREIGN PATENT DOCUMENTS

| | | |
|---|---|---|
| JP | 2009-289045 A | 12/2009 |
| JP | 2010-277377 A | 12/2010 |
| JP | 2015-005006 A | 1/2015 |
| JP | 2015-028687 A | 2/2015 |
| JP | 2015-069230 A | 4/2015 |
| JP | 2016-103137 A | 6/2016 |
| JP | 2019-067346 A | 4/2019 |
| WO | 2013/145491 A1 | 10/2013 |

* cited by examiner

| | DISPLAY AREA | DATE AND TIME OF SELECTION | SELECTED APP | ... |
|---|---|---|---|---|
| CLAMSHELL | B COVER AREA | 2020/12/1 10:00:00 | A BROWSER | ... |
| | | 2020/12/1 10:30:00 | A BROWSER | ... |
| | | ... | ... | ... |
| | C COVER AREA | 2020/12/1 10:00:00 | D MEMO SOFTWARE | ... |
| | | 2020/12/1 10:30:00 | PEN INPUT SOFTWARE | ... |
| | | ... | ... | ... |
| ... | ... | ... | ... | ... | ized operation occurred in, wherein the startup control
INFORMATION PROCESSING APPARATUS AND CONTROL METHOD

CROSS-REFERENCE TO RELATED APPLICATIONS

This application claims priority to Japanese Patent Application No. 2021-3025 filed Jan. 12, 2021, the contents of which are hereby incorporated herein by reference in their entirety.

TECHNICAL FIELD

The present disclosure relates to an information processing apparatus and a control method.

BACKGROUND

In recent years, there has been known an information processing apparatus capable of inputting various information by touching on a display screen with an operation medium such as a pen.

SUMMARY

An information processing apparatus according to one or more embodiments of the present disclosure includes a display unit having a plurality of display areas, a touch sensor unit configured to detect a predetermined operation by an operation medium on one of the plurality of display areas and to detect a position of the operation medium during the predetermined operation, and a startup control unit configured to display a menu of icons in the plurality of display areas upon the touch sensor unit sensing the predetermined operation, the menu of icons being different depending on a combination of an orientation of the display unit, and which of the plurality of display areas the predetermined operation occurred in, wherein the startup control unit is further configured to launch an application program corresponding to an icon selected by the operation medium from among the displayed icons in the menu.

DETAILED DESCRIPTION

An information processing apparatus and a control method according to multiple embodiments of the present disclosure will be described below with reference to the accompanying drawings.

First Embodiment

Figure 1:
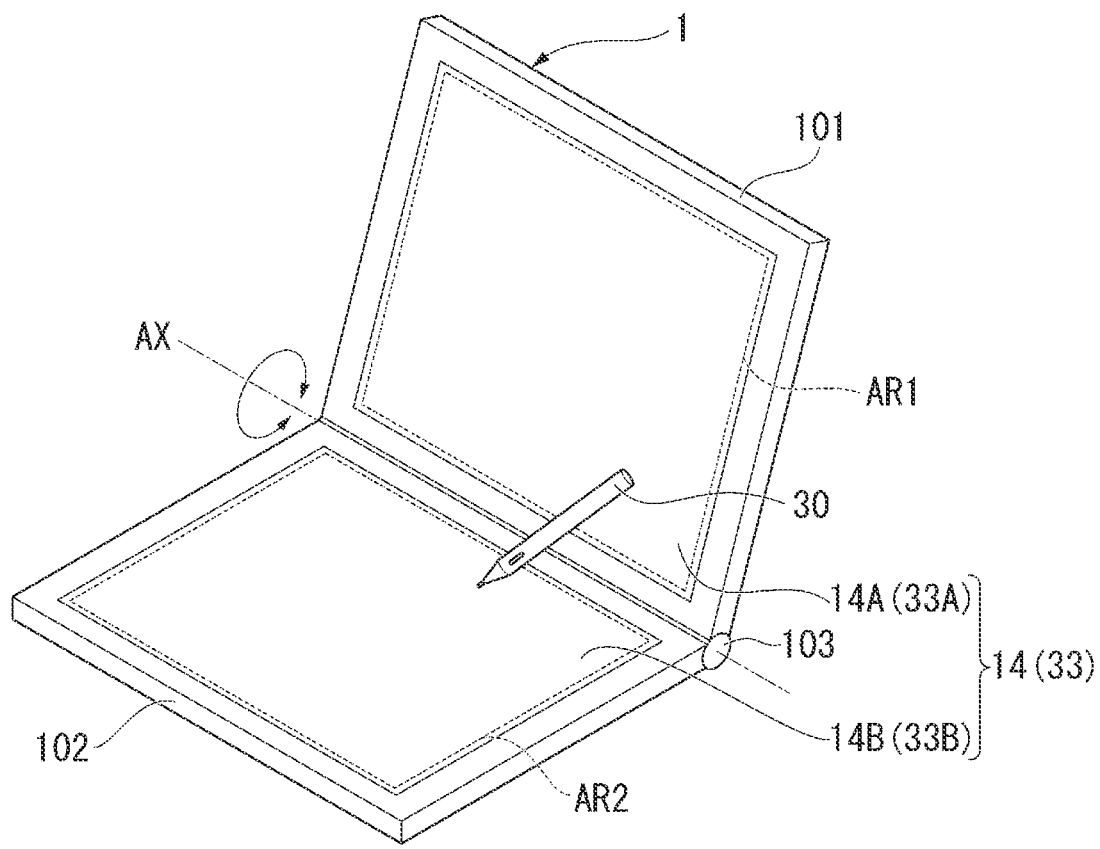
FIG. 1 is an external view illustrating an example of a laptop PC.

FIG. 1 is an external view illustrating an example of a laptop PC 1 according to the present embodiment. Note that the laptop PC 1 will be described as an example of the information processing apparatus in the present embodiment.

As illustrated in FIG. 1, the laptop PC 1 includes a first chassis 101, a second chassis 102, and a hinge mechanism 103.

The first chassis 101 is a chassis having a display unit 14A and a touch sensor unit 33A, which is connected to the second chassis 102 through the hinge mechanism 103. Note that a cover on one side of the first chassis 101 from which the display unit 14A is invisible (at the back of the display) is called A cover, and a cover on the other side of the first chassis 101 from which the display unit 14A is visible (on the display side) is called B cover.

The second chassis 102 is a chassis having a display unit 14B and a touch sensor unit 33B, which is connected to the first chassis 101 through the hinge mechanism 103. A motherboard with main hardware of the laptop PC 1 mounted thereon is housed inside the second chassis 102. Note that a cover on one side of the second chassis 102 from which the display unit 14B is visible (on the display side) is called C cover, and a cover on the other side of the second chassis 102 from which the display unit 14B is invisible (at the back of the display) is called D cover.

The hinge mechanism 103 (an example of a rotation mechanism) makes the first chassis 101 rotatable around a rotation axis AX relative to the second chassis 102 while coupling the first chassis 101 and the second chassis 102.

The display unit 14A is a display unit placed on the first chassis 101 and having a display area AR1 (first display area). Further, the display unit 14B is a display unit placed on the second chassis 102 and having a display area AR2 (second display area).

In the present embodiment, the display unit 14A and the display unit 14B are collectively called a display unit 14.

The touch sensor unit 33A is disposed to overlap the display unit 14A so as to detect that an operation medium such as an electronic pen 30 or a finger touches on a display screen (display area AR1) of the display unit 14A and to detect the touch position of the operation medium. Note that the touch sensor unit 33A can detect the position of the electronic pen 30 on the display screen (display area AR1) in a non-contact manner.

The touch sensor unit 33B is disposed to overlap the display unit 14B so as to detect that the operation medium such as the electronic pen 30 or the finger touches on a display screen (display area AR2) of the display unit 14B and to detect the touch position of the operation medium. Note that the touch sensor unit 33B can detect the position of the electronic pen 30 on the display screen (display area AR2) in a non-contact manner.

In the present embodiment, the touch sensor unit 33A and the touch sensor unit 33B are collectively called a touch sensor unit 33.

Figure 2:
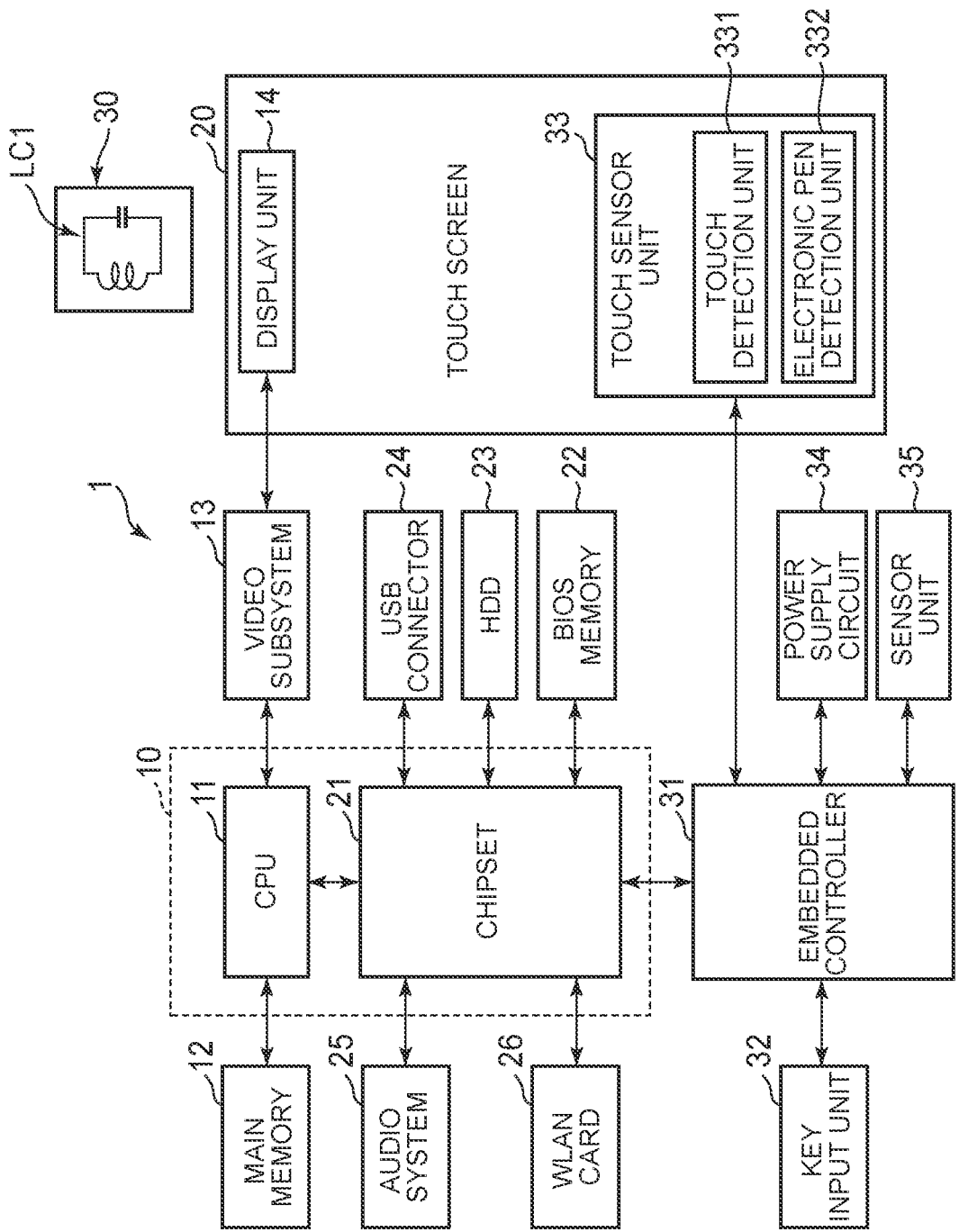
FIG. 2 is a diagram illustrating an example of the main hardware configuration of the laptop PC.

Referring next to FIG. 2, the main hardware configuration of the laptop PC 1 will be described.

FIG. 2 is a diagram illustrating an example of the main hardware configuration of the laptop PC 1 according to the present embodiment.

As illustrated in FIG. 2, the laptop PC 1 includes a CPU 11, a main memory 12, a video subsystem 13, the display unit 14, a chipset 21, a BIOS memory 22, an HDD 23, a USB connector 24, an audio system 25, a WLAN card 26, the electronic pen 30, an embedded controller 31, a key input unit 32, the touch sensor unit 33, a power supply circuit 34, and a sensor unit 35.

The CPU (Central Processing Unit) 11 executes various kinds of arithmetic processing by program control to control the entire laptop PC 1.

The main memory 12 is a writable memory used as reading areas of execution programs of the CPU 11 or working areas to which processing data of the execution programs are written. The main memory 12 is configured, for example, to include plural DRAM (Dynamic Random Access Memory) chips. The execution programs include an OS (Operating System), various device drivers for hardware-operating peripheral devices, various services/utilities, application programs (application software), and the like.

The video subsystem 13 is a subsystem for realizing functions related to image display, which includes a video controller. This video controller processes a drawing command from the CPU 11, writes processed drawing information into a video memory, and reads this drawing information from the video memory and outputs it to the display unit 14 as drawing data (display data).

The display unit 14 is, for example, a liquid crystal display or an organic EL (Electro-Luminescence) display to display a display screen based on the drawing data (display data) output from the video subsystem 13. The display unit 14 includes the display unit 14A and the display unit 14B as illustrated in FIG. 1 described above, and has two or more display areas (AR1, AR2). In other words, the two or more display areas include the display area AR1 (first display area) and the display area AR2 (second display area).

The chipset 21 includes controllers, such as USB (Universal Serial Bus), serial ATA (AT Attachment), an SPI (Serial Peripheral Interface) bus, a PCI (Peripheral Component Interconnect) bus, a PCI-Express bus, and an LPC (Low Pin Count) bus, and plural devices are connected to the chipset 21. In FIG. 2, the BIOS memory 22, the HDD 23, the USB connector 24, the audio system 25, the WLAN card 26, and the embedded controller 31 are connected to the chipset 21 as examples of the devices.

The BIOS (Basic Input Output System) memory 22 is configured, for example, by an electrically rewritable non-volatile memory such as an EEPROM (Electrically Erasable Programmable Read Only Memory) or a flash ROM. The BIOS memory 22 stores a BIOS and system firmware for controlling the embedded controller 31 and the like.

The HDD (Hard Disk Drive) 23 (an example of a non-volatile storage device) stores the OS, various drivers, various services/utilities, application programs (which may be called applications below), and various data. The USB connector 24 is a connector for connecting peripheral devices using the USB.

The audio system 25 records, plays back, and outputs sound data.

The WLAN (Wireless Local Area Network) card 26 is connected to a network by wireless LAN to perform data communication. For example, when receiving data from the network, the WLAN card 26 generates an event trigger indicating that data has been received.

The electronic pen 30 is a pen-like operation medium having a resonant circuit LC1. The electronic pen 30 is so configured that power is supplied to the electronic pen 30 by electromagnetic induction to a coil in the resonant circuit LC1 to be able to detect the position of the electronic pen 30 on the screen of the display unit 14 in a non-contact manner using the resonant circuit.

The embedded controller 31 is a one-chip microcomputer which monitors and controls various devices (peripheral devices, sensors, and the like) regardless of the system state of the laptop PC 1. Further, the embedded controller 31 has a power management function to control the power supply circuit 34. Note that the embedded controller 31 is composed of a CPU, a ROM, a RAM, and the like, which are not illustrated, and equipped with multi-channel A/D input terminal and D/A output terminal, a timer, and digital input/output terminals. To the embedded controller 31, for example, the key input unit 32, the touch sensor unit 33, the power supply circuit 34, the sensor unit 35, and the like are connected through these input/output terminals, and the embedded controller 31 controls the operation of these units.

The key input unit 32 is an input device such as to include a power switch and the like.

The touch sensor unit 33 detects the position of the operation medium such as the electronic pen 30 or the finger on the screen of the display unit 14, and a touch of the operation medium on the screen. For example, the touch sensor unit 33 detects that the electronic pen 30 (pen-like operation medium) has approached within a predetermined distance to the screen of the display unit 14, and when the electronic pen 30 has approached within the predetermined distance to the screen, the touch sensor unit 33 can detect the position of the electronic pen 30 above the screen in a non-contact manner.

In the present embodiment, the touch sensor unit 33 includes the touch sensor unit 33A and the touch sensor unit 33B as illustrated in FIG. 1 described above. Further, the touch sensor unit 33 and the display unit 14 constitute a touch screen 20.

Further, the touch sensor unit 33 includes a touch detection unit 331 and an electronic pen detection unit 332.

The touch detection unit 331 is, for example, a capacitive touch sensor to detect the operation medium (such as the electronic pen 30 or the finger) touching on the screen of the display unit 14, and detect the touch position of the operation medium.

The electronic pen detection unit 332 is, for example, an electromagnetic induction type touch sensor to detect the position of the electronic pen 30 on the screen of the display unit 14 in a non-contact manner by using the resonant circuit LC1 of the electronic pen 30. For example, the electronic pen detection unit 332 can detect that the electronic pen 30 has approached within the predetermined distance to the screen of the display unit 14.

Note that the touch sensor unit 33 can detect hovering as a state where the electronic pen 30 is stopped within the predetermined distance to the screen by having the touch detection unit 331 detect that the electronic pen 30 is not touching when the electronic pen detection unit 332 detects that the electronic pen 30 has approached within the predetermined distance to the screen of the display unit 14.

The power supply circuit 34 includes, for example, a DC/DC converter, a charge/discharge unit, a battery unit, an AC/DC adapter, and the like to convert DC voltage supplied from the AC/DC adapter or the battery unit into plural voltages required to operate the laptop PC 1. Further, the power supply circuit 34 supplies power to each unit of the laptop PC 1 under the control of the embedded controller 31.

The sensor unit 35 is, for example, an acceleration sensor, a gyro sensor, or the like to detect a screen display orientation indicative of a use state of the laptop PC 1. For example, the sensor unit 35 detects the direction of gravitational acceleration to detect the screen display orientation of the laptop PC 1 (display unit 14).

In the present embodiment, the CPU 11 and the chipset 21 described above correspond to a main control unit 10. The main control unit 10 executes processing based on the OS (for example, Windows (registered trademark)).

Figures 3, 4:
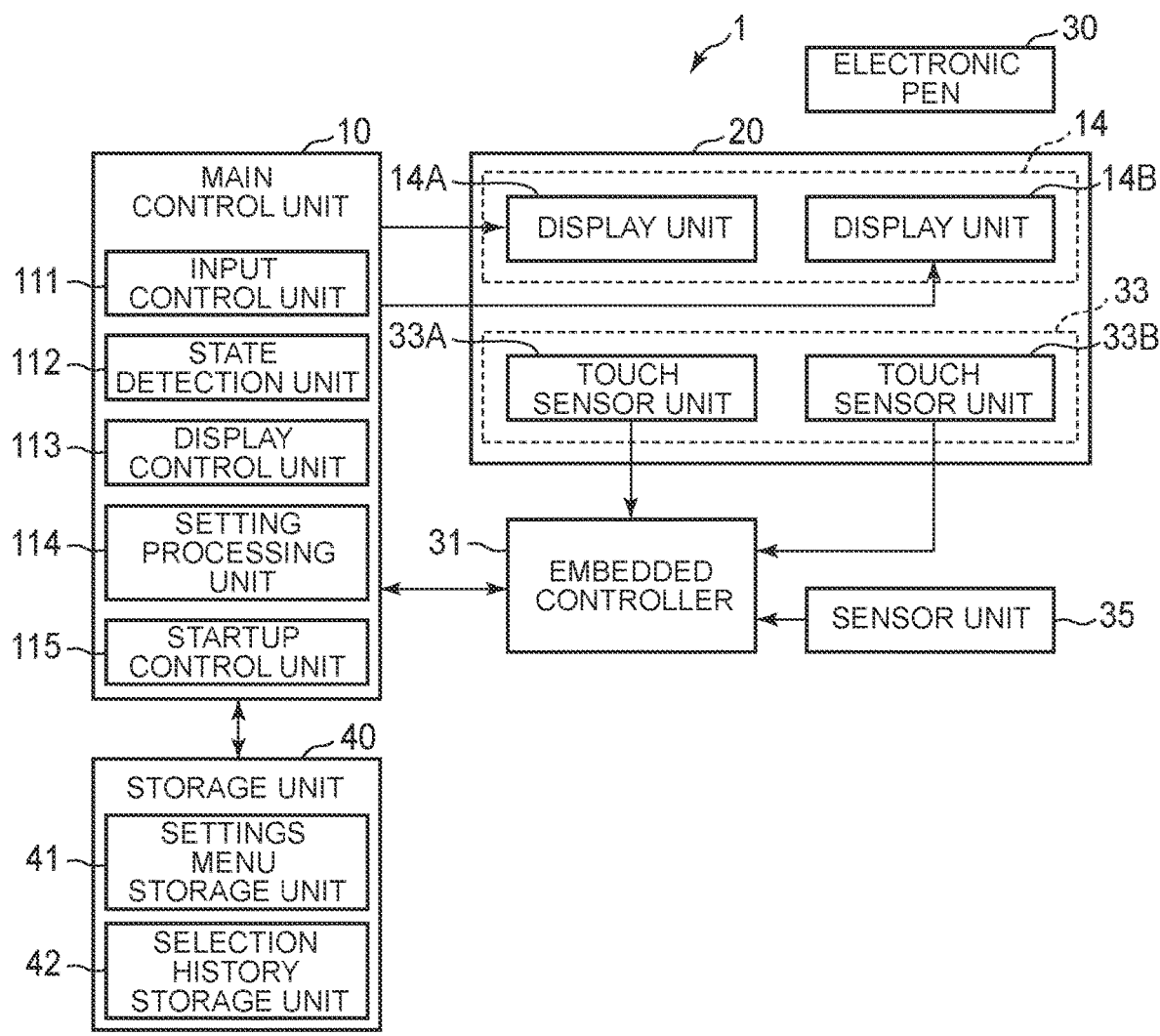
FIG. 3 is a block diagram illustrating an example of the functional configuration of the laptop PC.
FIG. 4 is a table illustrating a data example of a settings menu storage unit.

Referring next to FIG. 3, the functional configuration of the laptop PC 1 according to the present embodiment will be described.

FIG. 3 is a block diagram illustrating an example of the functional configuration of the laptop PC 1 according to the present embodiment.

As illustrated in FIG. 3, the laptop PC 1 includes the main control unit 10, the touch screen 20, the electronic pen 30, the embedded controller 31, the sensor unit 35, and a storage unit 40.

In FIG. 3, the touch screen 20 includes the display unit 14 and the touch sensor unit 33. Further, the display unit 14 has the display unit 14A and the display unit 14B illustrated in FIG. 1, and the touch sensor unit 33 has the touch sensor unit 33A and the touch sensor unit 33B illustrated in FIG. 1.

Note that only the main functional configuration related to the present embodiment is illustrated in FIG. 3 as the configuration of the laptop PC 1. Further, since the touch screen 20, the electronic pen 30, the embedded controller 31, and the sensor unit 35 are the same as those in FIG. 2 described above, the description thereof will be omitted here.

The storage unit 40 is, for example, a storage unit realized by the HDD 23, which includes a settings menu storage unit 41 and a selection history storage unit 42.

The settings menu storage unit 41 stores setting information on a menu of icons indicative of applications (hereinafter called an icon menu). The settings menu storage unit 41 stores, as setting information, a content of the icon menu to be displayed upon application startup processing using the electronic pen 30 to be described later. Referring here to FIG. 4, a data example of the settings menu storage unit 41 will be described.

FIG. 4 is a table illustrating a data example of the settings menu storage unit 41 in the present embodiment.

As illustrated in FIG. 4, the settings menu storage unit 41 stores display modes, display areas, menu information (applications) in association with one another.

In FIG. 4, the display modes are modes indicative of use states of the laptop PC 1. For example, a clamshell mode, a book mode, a tablet mode, and the like are included in the display modes. Further, each display area is information indicative of either one of the display area AR1 and the display area AR2 illustrated in FIG. 1, and the display areas are stored as a B cover area, a C cover area, a right area, a left area, and the like depending on the display mode.

Here, the clamshell mode is a mode used in a state as illustrated in FIG. 1, which is a mode where the orientation of the display screen is an orientation with the rotation axis AX of the hinge mechanism 103 and the horizontal axis of the display parallel to each other. Note that the displays of the display unit 14A and the display unit 14B in the clamshell mode are such that the longitudinal direction of each of the display unit 14A and the display unit 14B is the horizontal axis of the display, and the axis of the short direction of each of the display unit 14A and the display unit 14B is the vertical axis of the display.

Further, in the clamshell mode, the display area AR1 of the display unit 14A corresponds to the B cover area as an upper display area. Further, the display area AR2 of the display unit 14B corresponds to the C cover area as a lower display area.

Figure 8:
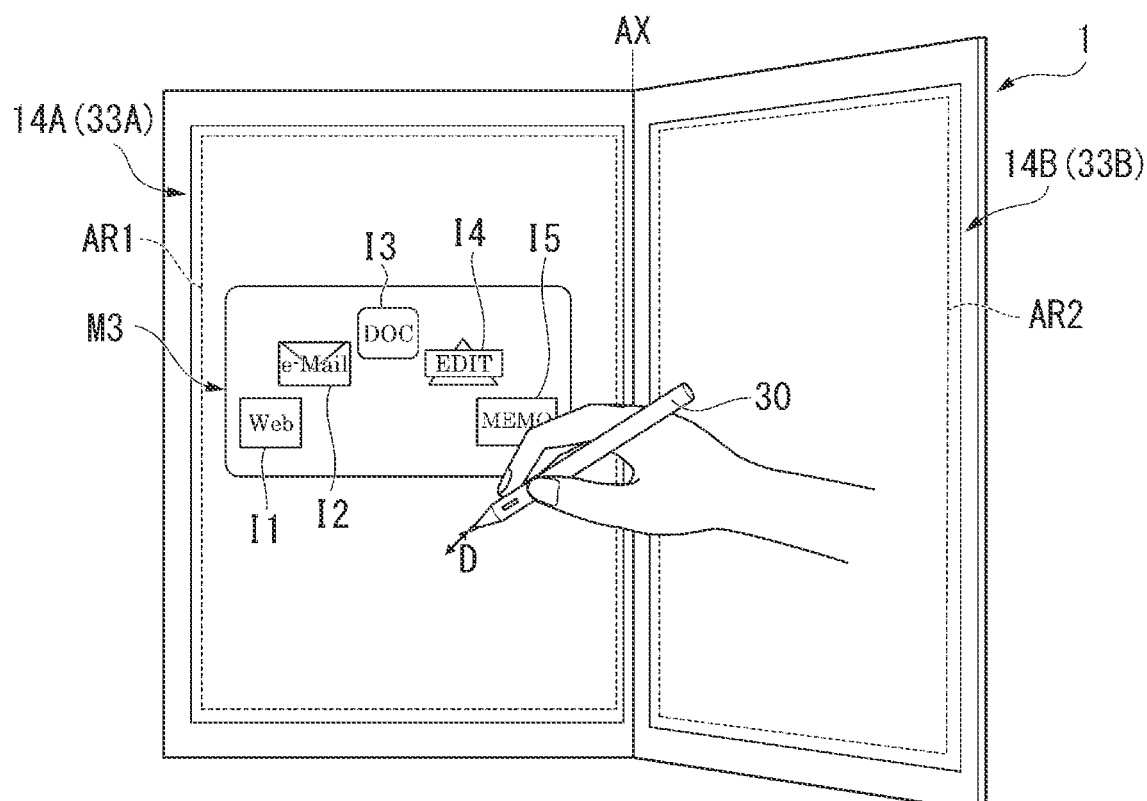
FIG. 8 is a first diagram illustrating a display example of an icon menu in a book mode.

Further, the book mode is a mode used in a state as illustrated in FIG. 8 to be described later, which is a mode where the orientation of the display screen is an orientation with the rotation axis AX of the hinge mechanism 103 and the vertical axis of the display parallel to each other. Note that the displays of the display unit 14A and the display unit 14B in the book mode are such that the longitudinal direction of each of the display unit 14A and the display unit 14B is the vertical axis of the display, and the axis of the short direction of each of the display unit 14A and the display unit 14B is the horizontal axis of the display.

Further, in the book mode, the display area AR1 of the display unit 14A corresponds to the left area as a left display area. Further, the display area AR2 of the display unit 14B corresponds to the right area as a right display area.

Further, the tablet mode is a mode where the laptop PC 1 is used in such a folded state that the hinge mechanism 103 is rotated 360 degrees to make the A cover and the D cover in contact with each other and the display unit 14A and the display unit 14B come to the front side.

Further, in FIG. 4, the menu information is setting information indicative of a list of applications whose icons are displayed in the icon menu. The menu information includes plural application names (an example of identification information of applications), which are stored, for example, in order of priority.

For example, in the example illustrated in FIG. 4, it is indicated that the menu information (setting information) when the display mode is "clamshell" and the display area is "B cover area" is "A browser," "B email software," "C word processor," . . . . Further, it is indicated that the menu information (setting information) when the display mode is "clamshell" and the display area is "C cover area" is "pen input software," "D memo software," "E memo software," . . . .

Further, when the display mode is "book," the menu information (setting information) is the same regardless of whether the display area is "right area" and "left area," and it is indicated that the menu information (setting information) is "A browser," "B email software," "C word processor," . . . .

Figures 5, 6:
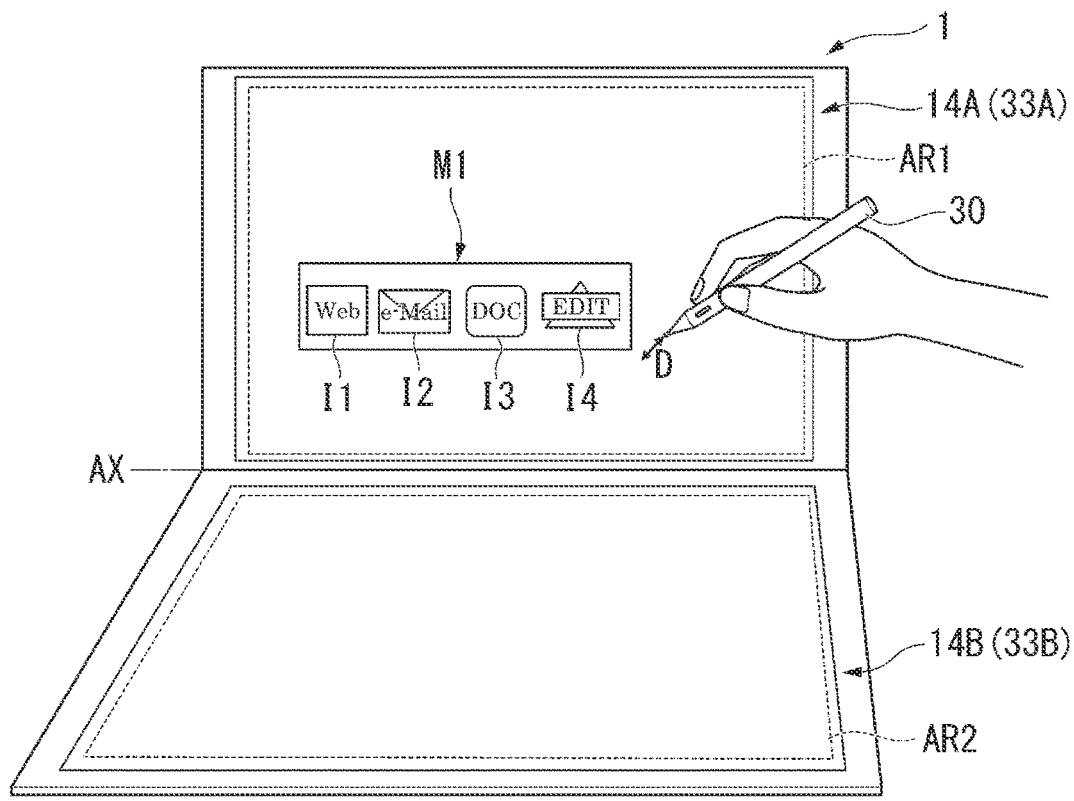
FIG. 5 is a table illustrating a data example of a selection history storage unit.
FIG. 6 is a first diagram illustrating a display example of an icon menu in a clamshell mode.

Returning to the description of FIG. 3, the selection history storage unit 42 stores a selection history of applications selected by the user from the icon menu. Referring here to FIG. 5, a data example of the selection history storage unit 42 will be described.

FIG. 5 is a table illustrating the data example of the selection history storage unit 42 in the present embodiment.

As illustrated in FIG. 5, the selection history storage unit 42 stores display modes, display areas, dates and times of selection, and selected apps (selected applications) in association with one another.

For example, in the example illustrated in FIG. 5, when the display mode is "clamshell" and the display area is "B cover area," it is indicated that "A browser" is selected by the user as a selected app on "2020/12/1 10:00:00" as the date and time of selection (at 10:00:00, on Dec. 1, 2020).

Returning to the description of FIG. 3 again, the main control unit 10 is a functional unit implemented by the CPU 11 and the chipset 21 executing programs stored in the main memory 12 to execute various processing based on the OS. The main control unit 10 includes, for example, an input control unit 111, a state detection unit 112, a display control unit 113, a setting processing unit 114, and a startup control unit 115.

The input control unit 111 is, for example, a device driver to control input by the touch sensor unit 33, which detects the position and touch of the operation medium on the screen of the display unit 14. For example, when the touch sensor unit 33 detects that the electronic pen 30 has approached within the predetermined distance to the screen of the display unit 14, the input control unit 111 acquires detection information indicating that the electronic pen 30 has approached within the predetermined distance, and the position coordinates of the electronic pen 30 on the screen (display area) of the display unit 14.

The state detection unit 112 acquires, for example, gravitational acceleration information from the sensor unit 35 to detect the mode indicative of the use state of the laptop PC 1, such as the clamshell mode, the book mode, or the tablet mode.

The display control unit 113 is, for example, a device driver to control a display provided to the display unit 14 so as to display various information (such as images, the icon menu, and the like) in the display area (AR1, AR2) of the display unit 14.

The setting processing unit 114 is a functional unit to set the setting information of the icon menu so as to store the setting information of the icon menu in the settings menu storage unit 41 according to a request from the user. The setting processing unit 114 registers and changes the setting information in the settings menu storage unit 41, for example, as illustrated in FIG. 4, according to the user's request.

The startup control unit 115 executes processing to start an application using the icon menu. When a predetermined operation is executed on the screen of the display unit 14 with the operation medium, the startup control unit 115 displays the icon menu in a display area in which the operation medium is detected. Here, the operation medium is, for example, the electronic pen 30, and the predetermined operation on the screen of the display unit 14 is an operation (hovering operation) to keep the electronic pen 30 hovering as a state where the electronic pen 30 is stopped within the predetermined distance to the screen for a certain period of time (for example, stopped for one second). For example, when the hovering operation of the electronic pen 30 is detected through the input control unit 111, the startup control unit 115 displays, in a display area with the electronic pen 30 detected therein, an icon menu different depending on the display area with the electronic pen 30 detected therein and the screen display orientation of the display unit 14.

The startup control unit 115 acquires, from the settings menu storage unit 41, setting information of an icon menu corresponding to a combination of the display area with the electronic pen 30 detected therein and a display orientation mode (display mode) detected by the state detection unit 112 to display the icon menu based on the acquired setting information of the icon menu. Note that the startup control unit 115 displays the icon menu in the display area (AR1, AR2) of the display unit 14 through the display control unit 113.

Figure 7:
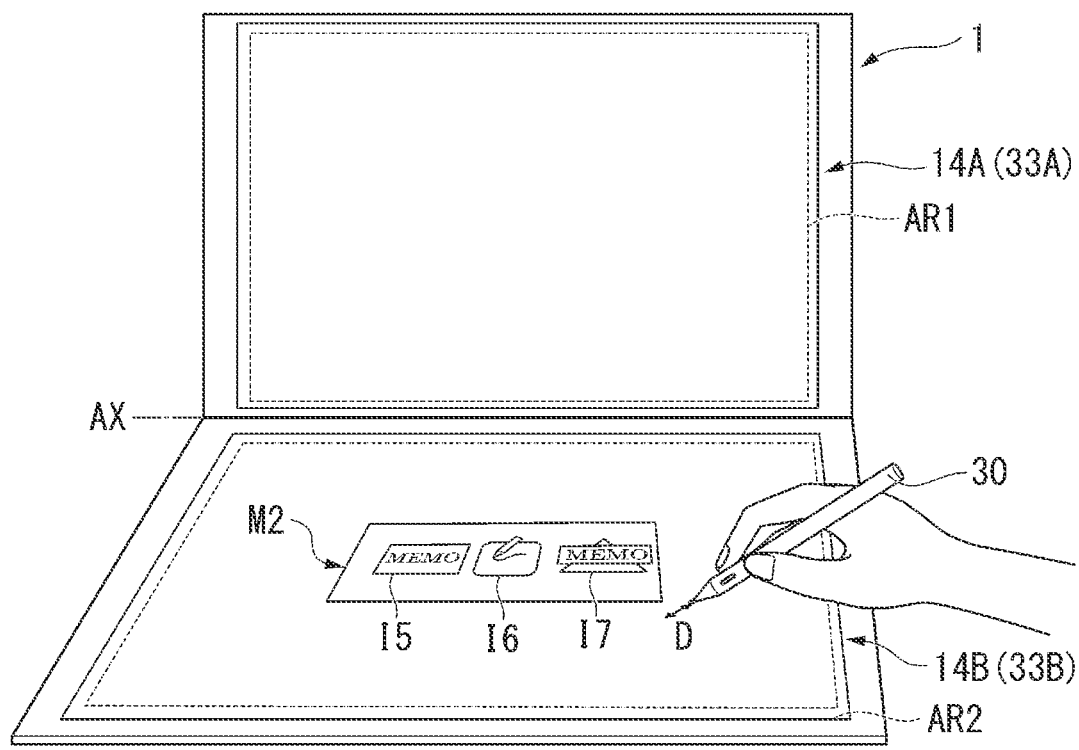
FIG. 7 is a second diagram illustrating another display example of the icon menu in the clamshell mode.

For example, in the clamshell mode, when the hovering operation of the electronic pen 30 is detected and when the detected display area is the B cover area (display area AR1), the startup control unit 115 displays an icon menu mainly including display related applications such as a browser. Further, for example, in the clamshell mode, when the hovering operation of the electronic pen 30 is detected and when the detected display area is the C cover area (display area AR2), the startup control unit 115 displays an icon menu mainly including input related applications such as memo software. Referring here to FIG. 6 and FIG. 7, display examples of icon menus in the clamshell mode will be described.

FIG. 6 and FIG. 7 are diagrams illustrating display examples of icon menus in the clamshell mode of the present embodiment.

As illustrated in FIG. 6, when the hovering operation of the electronic pen 30 at a distance D to the screen is detected in the display area AR1 (B cover area), the startup control unit 115 displays an icon menu M1 including icon I1 to icon I4 around the position of the electronic pen 30. Here, the distance D is a length equal to or less than a threshold value at which the touch sensor unit 33 can detect the electronic pen 30. The startup control unit 115 uses the touch sensor unit 33 to detect such a hovering operation that the electronic pen 30 is kept for the certain period of time in a state of being stopped within the threshold value (within the predetermined distance) at which the electronic pen 30 is detectable with respect to the screen. Further, the icon I1 to icon I4 are display related applications such as a browser, email software, document display software, and an editor, which are icons corresponding to applications stored in the settings menu storage unit 41 as setting information of the B cover area in the clamshell mode.

Further, as illustrated in FIG. 7, when the hovering operation of the electronic pen 30 at the distance D to the screen is detected in the display area AR2 (C cover area), the startup control unit 115 displays an icon menu M2 including icon I5 to icon I7 around the position of the electronic pen 30. Here, the icon I5 to icon I7 are input related applications such as memo software, pen input software, and memo software, which are icons corresponding to applications stored in the settings menu storage unit 41 as setting information of the C cover area in the clamshell mode.

Thus, when the display mode is the clamshell mode in which the screen display orientation is the orientation with the rotation axis AX of the hinge mechanism 103 and the horizontal axis of the display parallel to each other, the startup control unit 115 displays an icon menu different between whether the display area with the electronic pen 30 detected therein is the display area AR1 (first display area) or the display area AR2 (second display area).

Figure 9:
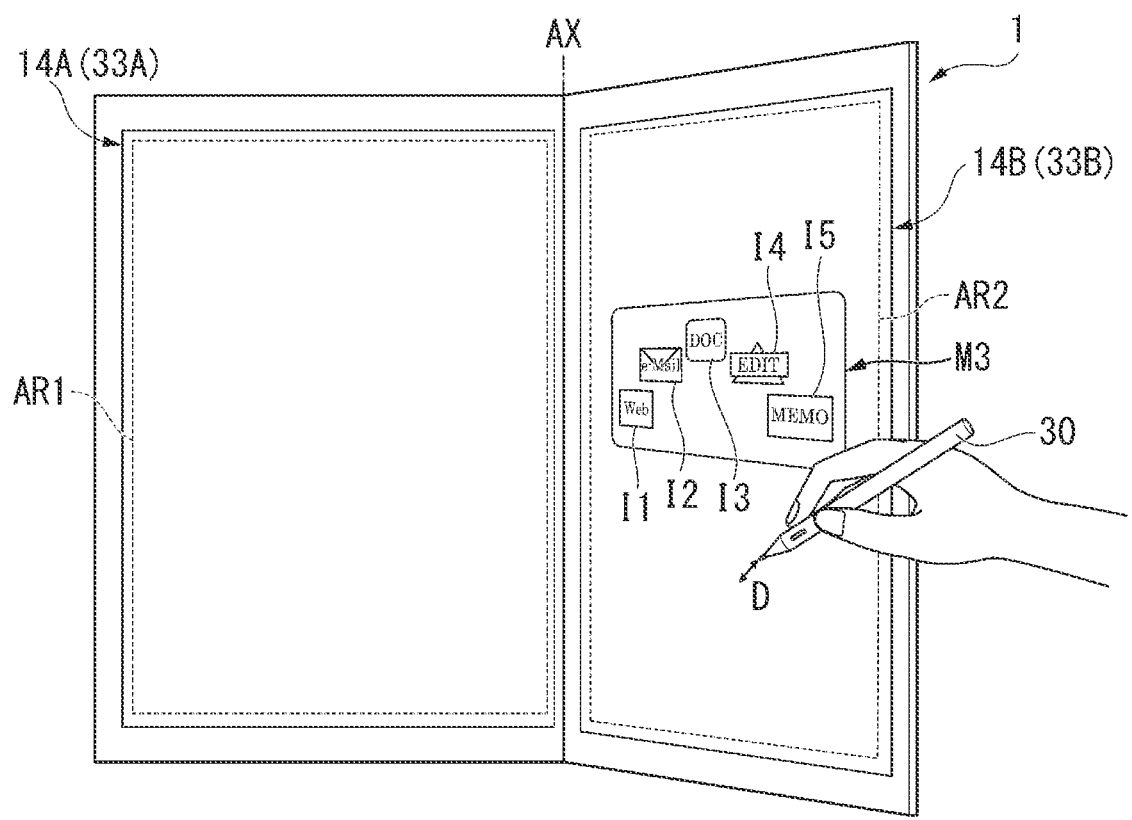
FIG. 9 is a second diagram illustrating another display example of the icon menu in the book mode.

Returning to the description of FIG. 3 again, when the hovering operation of the electronic pen 30 is detected, for example, in the book mode, the startup control unit 115 displays an identical icon menu in both display areas, that is, in the left area (display area AR1) and the right area (display area AR2). Referring here to FIG. 8 and FIG. 9, a display example of an icon menu in the book mode will be described.

FIG. 8 and FIG. 9 are diagrams illustrating a display example of an icon menu in the book mode of the present embodiment.

As illustrated in FIG. 8, when the hovering operation of the electronic pen 30 at the distance D to the screen is detected in the display area AR1 (left area), the startup control unit 115 displays an icon menu M3 including icon I1 to icon I5 around the position of the electronic pen 30. Further, the icon I1 to icon I5 are icons corresponding to applications stored in the settings menu storage unit 41 as setting information in the book mode.

Further, as illustrated in FIG. 9, when the hovering operation of the electronic pen 30 at the distance D to the screen is detected in the display area AR2 (right area), the startup control unit 115 displays the icon menu M3 including the same icon I1 to icon I5 as those in FIG. 8 around the position of the electronic pen 30.

Thus, when the display mode is the book mode in which the screen display orientation is the orientation with the rotation axis AX of the hinge mechanism 103 and the vertical axis of the display parallel to each other, the startup control unit 115 displays an identical icon menu regardless of whether the display area with the electronic pen 30 detected therein is the display area AR1 (first display area) or the display area AR2 (second display area).

Returning to the description of FIG. 3 again, the startup control unit 115 starts (i.e. launches) an application, corresponding to an icon selected by touching the screen with the electronic pen 30 (by a touch on the screen) in the displayed icon menu, in the display area with the electronic pen 30 detected therein.

Further, according to a selection history indicative of the icon being selected in the past, the startup control unit 115 changes the icon menu to be displayed. The startup control unit 115 stores, for example, information on the selected icon in the selection history storage unit 42 as a selection history as illustrated in FIG. 5. Further, for example, based on the selection history stored in the selection history storage unit 42, the startup control unit 115 sums up the selection frequency of each icon to change setting information (menu information) of the settings menu storage unit 41 so as to preferentially display an application corresponding to an icon having a higher selection frequency.

For example, when part of the menu information of the settings menu storage unit 41 is displayed in the icon menu, the startup control unit 115 displays, in the icon menu, the part of the menu information with a higher selection frequency.

Next, the operation of the laptop PC 1 according to the present embodiment will be described with reference to the accompanying drawings.

Figure 10:
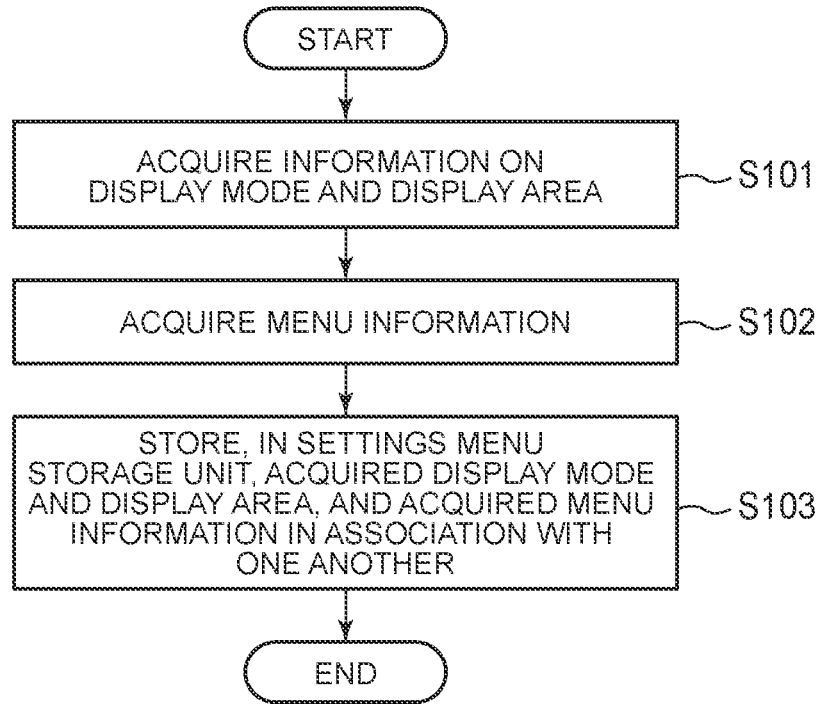
FIG. 10 is a flowchart illustrating an example of icon menu setting processing of the laptop PC.

FIG. 10 is a flowchart illustrating an example of icon menu setting processing of the laptop PC 1 according to the present embodiment.

As illustrated in FIG. 10, the setting processing unit 114 of the laptop PC 1 first acquires information on a display mode and a display area (step S101). The setting processing unit 114 acquires the information on the display mode and the display area input based on an operation of the touch sensor unit 33 by the user through the input control unit 111.

Next, the setting processing unit 114 acquires menu information (step S102). The setting processing unit 114 acquires the menu information input based on an operation of the touch sensor unit 33 by the user through the input control unit 111. Here, the menu information is information on applications to be displayed in the icon menu. The menu information may also be such that the applications are selected with operations of the touch sensor unit 33 from the list of applications held in the laptop PC 1.

Next, the setting processing unit 114 stores, in the settings menu storage unit 41, the acquired display mode and display area, and the acquired menu information in association with one another (step S103). For example, the setting processing unit 114 stores, in the settings menu storage unit 41, the display mode and the display area, and the menu information in association with one another as illustrated in FIG. 4. After the process of step S103, the setting processing unit 114 ends the icon menu setting processing.

Figure 11:
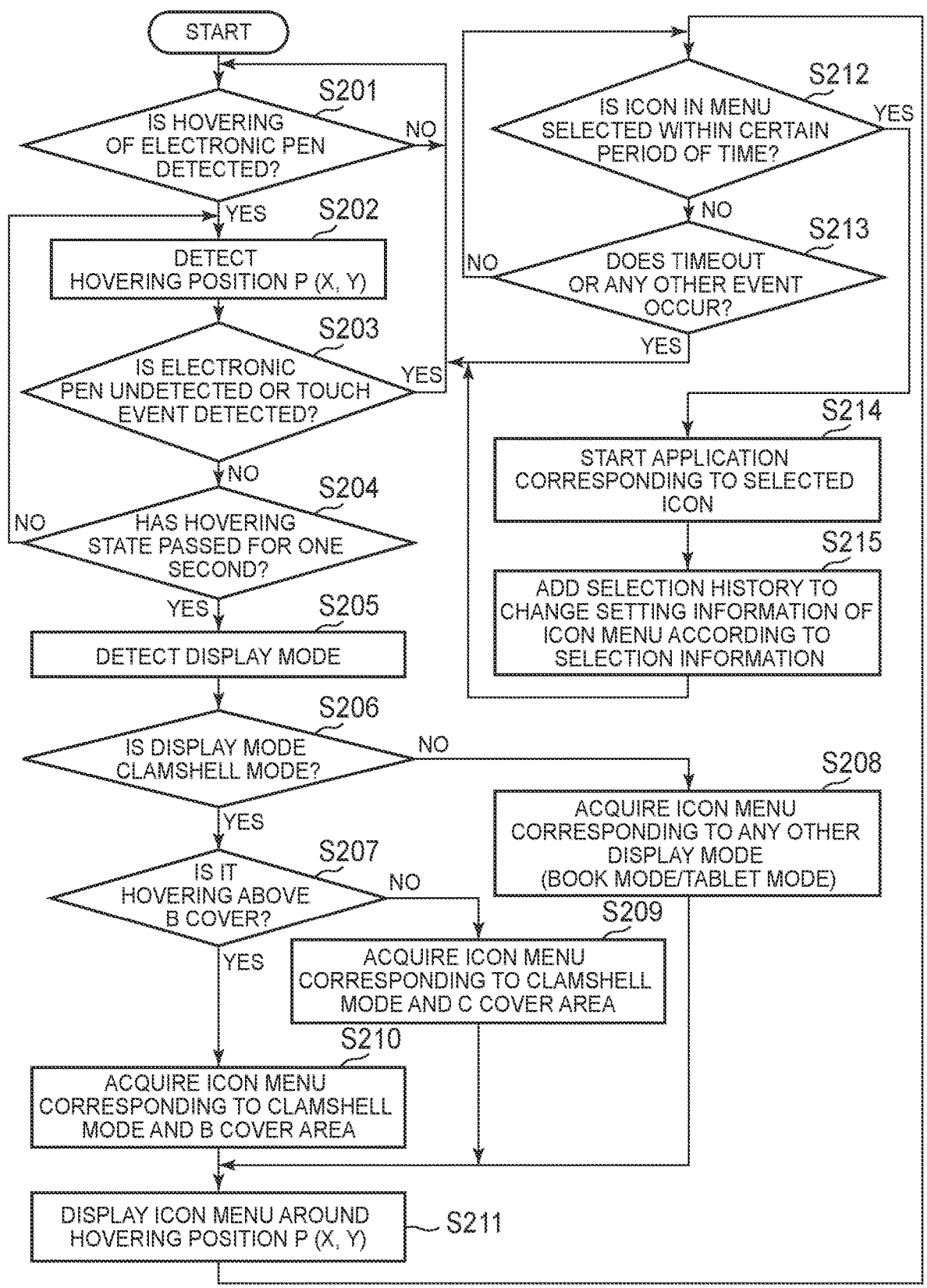
FIG. 11 is a flowchart illustrating an example of application startup processing of the laptop PC.

Referring next to FIG. 11, application startup processing of the laptop PC 1 according to the present embodiment will be described.

FIG. 11 is a flowchart illustrating an example of application startup processing of the laptop PC 1 according to the present embodiment.

As illustrated in FIG. 11, the startup control unit 115 of the laptop PC 1 first determines whether or not hovering of the electronic pen 30 is detected (step S201). The startup control unit 115 determines whether or not the touch sensor unit 33 detects hovering of the electronic pen 30 through the input control unit 111. Note that the touch sensor unit 33 has the electronic pen detection unit 332 detect hovering, as a stopped state of the screen of the display unit 14 and the electronic pen 30 within the predetermined distance therebetween, from a load variation due to the supply of power to the resonant circuit LC1 of the electronic pen 30 by electromagnetic induction. When hovering of the electronic pen 30 is detected (step S201: YES), the startup control unit 115 proceeds to step S202. On the other hand, when hovering of the electronic pen 30 is not detected (step S201: NO), the startup control unit 115 returns to step S201.

In step S202, the startup control unit 115 detects a hovering position P (X, Y). The startup control unit 115 acquires the hovering position P (X, Y) of the electronic pen 30 on the screen of the display unit 14 detected by the touch sensor unit 33 through the input control unit 111.

Next, the startup control unit 115 determines whether the electronic pen 30 is undetected or a touch event is detected (step S203). The startup control unit 115 determines whether the electronic pen 30 is undetected by the touch sensor unit 33 through the input control unit 111 or such an event that the screen of the display unit 14 is touched with the operation medium such as the finger or the electronic pen 30 has occurred. When the electronic pen 30 is undetected or the touch event is detected (step S203: YES), the startup control unit 115 returns to step S201. On the other hand, when the electronic pen 30 is detected and the touch event is not detected (step S203: NO), the startup control unit 115 proceeds to step S204.

In step S204, the startup control unit 115 determines whether or not the hovering state has passed for one second. In other words, the startup control unit 115 determines whether or not hovering is kept for one second (an example of the certain period of time). When the hovering state has passed for one second (step S204: YES), the startup control unit 115 proceeds to step S205. On the other hand, when the hovering state has not passed for one second (step S204: NO), the startup control unit 115 returns to step S202.

In step S205, the startup control unit 115 detects the display mode. The startup control unit 115 detects the display mode (display orientation mode) as a use state through the state detection unit 112. Note that the state detection unit 112 detects the display mode based, for example, on the direction of gravitational acceleration detected by the sensor unit 35.

Next, the startup control unit 115 determines whether or not the display mode is the clamshell mode (step S206). The startup control unit 115 acquires the display mode (display orientation mode) as a use state detected by the state detection unit 112, and determines whether or not the display mode is the clamshell mode. When the display mode is the clamshell mode (step S206: YES), the startup control unit 115 proceeds to step S207. On the other hand, when the display mode is not the clamshell mode (for example, when the display mode is the book mode) (step S206: NO), the startup control unit 115 proceeds to step S208.

In step S207, the startup control unit 115 determines whether or not it is hovering above the B cover (step S207). Based on the hovering position P (X, Y), the startup control unit 115 determines whether the hovering position is in the display area AR1 (B cover area) or in the display area AR2 (C cover area). When it is hovering above the B cover (in the display area AR1 (B cover area)) (step S207: YES), the startup control unit 115 proceeds to step S210. On the other hand, when it is not hovering above the B cover (it is in the display area AR2 (C cover area)) (step S207: NO), the startup control unit 115 proceeds to step S209.

Further, in step S208, the startup control unit 115 acquires an icon menu corresponding to any other display mode (book mode/tablet mode). For example, the startup control unit 115 acquires, from the settings menu storage unit 41, the display mode and menu information (setting information) corresponding to the right area or the left area. After the process of step S208, the startup control unit 115 proceeds to step S211.

Further, in step S209, the startup control unit 115 acquires an icon menu corresponding to the clamshell mode and the C cover area. The startup control unit 115 acquires, from the settings menu storage unit 41, menu information (setting information) corresponding to the clamshell mode and the C cover area. Here, the menu information (setting information) is an icon menu mainly including input related applications such as memo software as illustrated in FIG. 7. After the process of step S209, the startup control unit 115 proceeds to step S211.

Further, in step S210, the startup control unit 115 acquires an icon menu corresponding to the clamshell mode and the B cover area. The startup control unit 115 acquires, from the settings menu storage unit 41, menu information (setting information) corresponding to the clamshell mode and the B cover area. Here, the menu information (setting information) is an icon menu mainly including display related applications such as a browser as illustrated in FIG. 6. After the process of step S210, the startup control unit 115 proceeds to step S211.

In step S211, the startup control unit 115 displays the icon menu around the hovering position P (X, Y). The startup control unit 115 displays, around the hovering position P (X, Y), the icon menu based on the menu information (setting information) acquired from the settings menu storage unit 41 (see FIG. 6 to FIG. 9).

Next, the startup control unit 115 determines whether or not an icon in the menu is selected within a certain period of time (steps S212 and S213). The startup control unit 115 determines whether or not an icon in the icon menu is selected by the user, for example, with the electronic pen 30 or the finger through the input control unit 111. When an icon in the menu is selected within the certain period of time (for example, within three seconds) (step S212: YES), the startup control unit 115 proceeds to step S214. On the other hand, when any icon within the menu is not selected within the certain period of time (for example, within three seconds) or some other event occurs (step S213: YES), the startup control unit 115 returns to step S201.

Next, the startup control unit 115 starts an application corresponding to the selected icon (step S214).

Next, the startup control unit 115 adds the selection history to change the setting information of the icon menu according to the selection information (step S215). The startup control unit 115 adds the selection history corresponding to the selected icon to the selection history storage unit 42 as illustrated in FIG. 5. Further, based on the selection history stored in the selection history storage unit 42, the startup control unit 115 sums up the selection frequency of each icon to change the setting information (menu information) of the settings menu storage unit 41 so as to preferentially display an application corresponding to an icon having a higher selection frequency. After the process of step S215, the startup control unit 115 returns to step S201.

Figure 12:
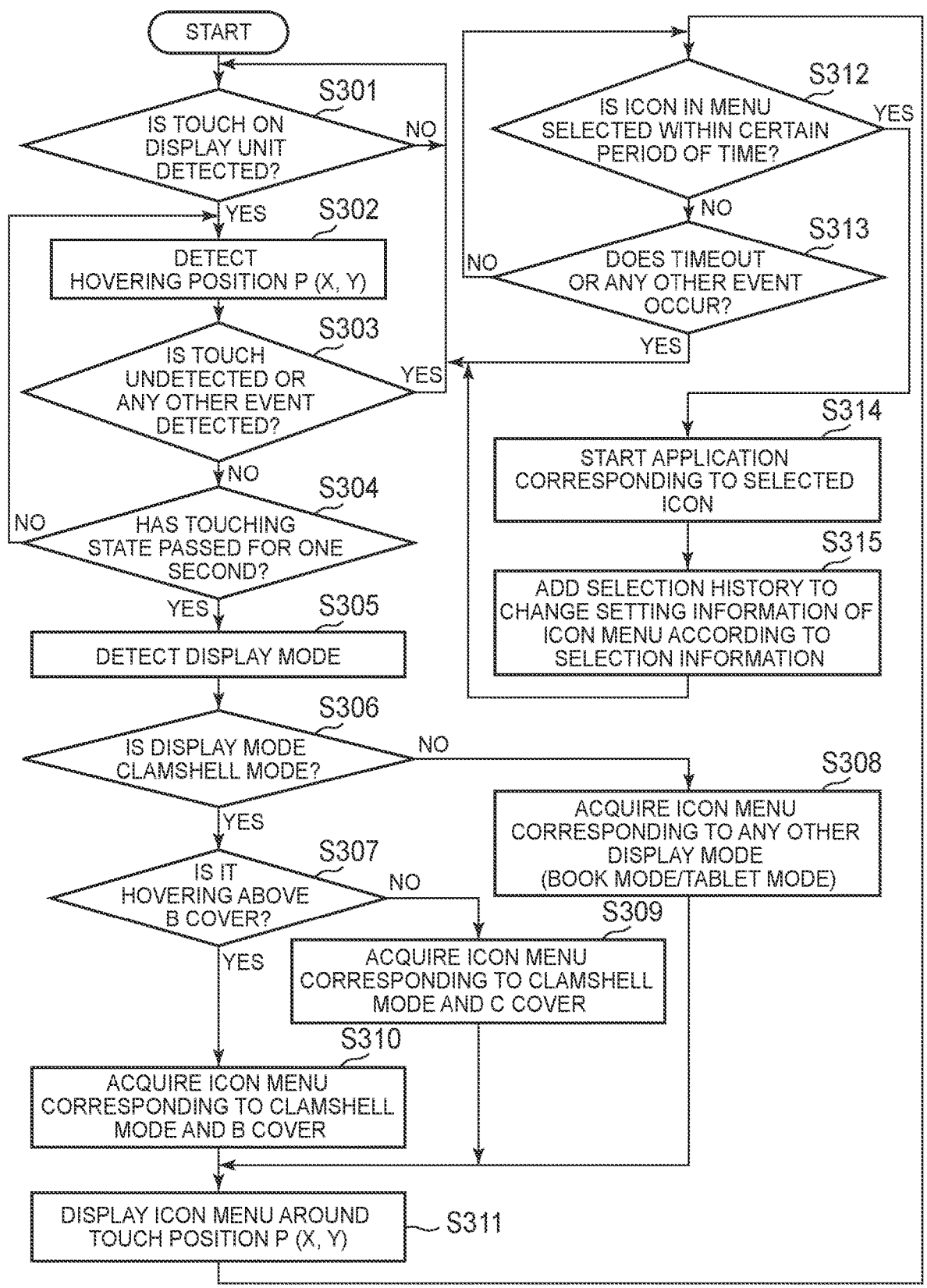
FIG. 12 is a flowchart illustrating a modification of application startup processing of the laptop PC.

Referring next to FIG. 12, a modification of application startup processing of the laptop PC 1 according to the present embodiment will be described.

In the application startup processing illustrated in FIG. 11 described above, the example in which the operation medium is the electronic pen 30 and the predetermined operation as a trigger to display an icon menu is the operation to keep the electronic pen 30 hovering for the certain period of time is described, but the present disclosure is not limited to this example. For example, the operation medium may also be a pen-like operation medium or a finger of the user instead of the electronic pen 30, and the predetermined operation may be an operation to keep a state of stopping the operation medium while touching on the screen for the certain period of time. Referring here to FIG. 12, a modification in the case of an operation to keep a state of stopping the operation medium, such as a pen-like operation medium or a finger of the user, while touching on the screen for the certain period of time will be described.

FIG. 12 is a flowchart illustrating a modification of application startup processing of the laptop PC 1 according to the present embodiment.

As illustrated in FIG. 12, the startup control unit 115 of the laptop PC 1 first determines whether or not a touch on the display unit 14 is detected (step S301). The startup control unit 115 determines whether or not the touch sensor unit 33 detects a touch of the operation medium on the screen of the display unit 14 through the input control unit 111. Note that the touch sensor unit 33 has the touch detection unit 331 detect a touch of the operation medium from a capacitance variation. When a touch on the display unit 14 is detected (step S301: YES), the startup control unit 115 proceeds to step S302. On the other hand, when no touch on the display unit 14 is detected (step S301: NO), the startup control unit 115 returns to step S301.

In step S302, the startup control unit 115 detects a touch position P (X, Y). The startup control unit 115 acquires the touch position P (X, Y) of the operation medium on the screen of the display unit 14 detected by the touch sensor unit 33 through the input control unit 111.

Next, the startup control unit 115 determines whether no touch is detected or any other event is detected (step S303). The startup control unit 115 determines whether no touch is detected or any other event has occurred through the input control unit 111. When no touch is detected or any other event has occurred (step S303: YES), the startup control unit 115 returns to step S301. On the other hand, when the detection of the touch is kept and any other event is not detected (step S303: NO), the startup control unit 115 proceeds to step S304.

In step S304, the startup control unit 115 determines whether or not the touching state of the operation medium has passed for one second. In other words, the startup control unit 115 determines whether or not the touching state of the operation medium is kept for one second (the example of the certain period of time). When the touching state of the operation medium has passed for one second (step S304: YES), the startup control unit 115 proceeds to step S305. On the other hand, when the touching state of the operation medium has not passed for one second (step S304: NO), the startup control unit 115 returns to step S302.

Since subsequent processes from step S305 to step S310 are the same as the processes from step S205 to step S210 illustrated in FIG. 11 described above, the description thereof will be omitted here.

In step S311, the startup control unit 115 displays an icon menu around the touch position P (X, Y). The startup control unit 115 displays, around the touch position P (X, Y), an icon menu based on the menu information (setting information) acquired from the settings menu storage unit 41 (see FIG. 6 to FIG. 9).

Since subsequent processes from step S312 to step S315 are the same as the processes from step S212 to step S215 illustrated in FIG. 11 described above, the description thereof will be omitted here.

Thus, the finger of the user or the pen-like operation medium can also be the operation medium instead of the electronic pen 30.

When the predetermined operation is executed on the screen with the finger of the user or the pen-like operation medium, the startup control unit 115 may also display a different icon menu in a display area with the finger of the user or the pen-like operation medium detected therein depending on the display area with the finger of the user or the pen-like operation medium detected therein and the screen display orientation of the display unit 14.

As described above, the laptop PC 1 (information processing apparatus) according to the present embodiment includes the display unit 14 having two or more display areas, the touch sensor unit 33, and the startup control unit 115. The touch sensor unit 33 detects the position of the operation medium (for example, the electronic pen 30) on the screen of the display unit 14, and a touch of the operation medium on the screen. When the predetermined operation is executed on the screen with the operation medium, the startup control unit 115 displays, in a display area with the operation medium detected therein, a menu of icons (icon menu) different depending on the display area, in which the operation medium is detected among the two or more display areas, and the screen display orientation of the display unit 14. In the display area with the operation medium detected therein, the startup control unit 115 starts an application program corresponding to an icon selected with a touch of the operation medium from among the displayed icons in the menu.

Thus, for example, the laptop PC 1 according to the present embodiment does not need to perform an operation to display a list of applications from the operation screen, and the user can execute the predetermined operation on the screen with the operation medium to easily display the icon menu so as to select and start an application. Therefore, the laptop PC 1 according to the present embodiment can simplify the operation to start an application, and hence can start the application quickly.

Further, since the laptop PC 1 according to the present embodiment displays an icon menu different depending on the display area with the operation medium detected therein and the screen display orientation of the display unit 14, an appropriate icon menu corresponding to the use state and the display area can be displayed, and the appropriate application corresponding to the use state and the display area can be started quickly.

Further, in the present embodiment, the two or more display areas include the display area AR1 (first display area) and the display area AR2 (second display area). Further, the laptop PC 1 includes the first chassis 101, the second chassis 102, and the hinge mechanism 103 (rotation mechanism). The first chassis 101 has at least the display area AR1 (first display area). The second chassis 102 has at least the display area AR2 (second display area). When the screen display orientation is an orientation with the rotation axis AX of the hinge mechanism 103 and the horizontal axis of the display parallel to each other (for example, when the display mode is the clamshell mode), the startup control unit 115 displays an icon menu different between whether the display area with the electronic pen 30 detected therein is the display area AR1 (first display area) or the display area AR2 (second display area).

Thus, since the laptop PC 1 according to the present embodiment displays an icon menu different depending on the display area with the operation medium detected therein, an appropriate icon menu corresponding to the display area can be displayed. When the laptop PC 1 according to the present embodiment is used, for example, in the clamshell mode, icon menus different between the B cover area and the C cover area can be displayed, and hence convenience can be improved.

Further, in the present embodiment, when the screen display orientation is an orientation with the rotation axis AX of the hinge mechanism 103 and the vertical axis of the display parallel to each other, the startup control unit 115 displays an identical icon menu regardless of whether the display area with the electronic pen 30 detected therein is the display area AR1 (first display area) or the display area AR2 (second display area).

Thus, for example, when the laptop PC 1 according to the present embodiment is used in the book mode, the same icon menu can be displayed both in the left area and in the right area, and hence convenience can be improved.

Further, in the present embodiment, the startup control unit 115 changes the icon menu to be displayed according to a selection history indicative of each icon being selected in the past. For example, the startup control unit 115 changes the icon menu to preferentially display a frequently used application according to the selection history.

Thus, for example, the laptop PC 1 according to the present embodiment can preferentially display the frequently used application in the icon menu, and hence convenience can further be improved.

Further, in the present embodiment, the operation medium is a pen-like operation medium (for example, the electronic pen 30). The touch sensor unit 33 detects that the pen-like operation medium has approached within the predetermined distance to the screen of the display unit 14, and when the pen-like operation medium has approached within the predetermined distance to the screen, the touch sensor unit 33 can detect the position of the pen-like operation medium above the screen in a non-contact manner. The startup control unit 115 uses the touch sensor unit 33 to detect, as the predetermined operation, an operation (hovering operation) to keep a state where the pen-like operation medium is stopped within the predetermined distance to the screen for the certain period of time (for example, to keep the state for one second).

Thus, since the laptop PC 1 according to the present embodiment can display an icon menu easily by hovering of the pen-like operation medium, the operation to start an application can be simplified, and hence the application can be started quickly.

Further, in the present embodiment, the pen-like operation medium is the electronic pen 30 including the resonant circuit LC1. The touch sensor unit 33 detects, by electromagnetic induction, that the electronic pen 30 has approached within the predetermined distance to the screen, and the position of the electronic pen 30 above the screen.

Thus, the laptop PC 1 according to the present embodiment can easily detect hovering of the electronic pen 30 by electromagnetic induction.

Further, in the present embodiment, the finger of the user is included in operation mediums. When the predetermined operation is executed on the screen with the finger of the user, the startup control unit 115 displays, in a display area with the finger of the user detected therein, a menu of icons different depending on the display area with the finger of the user detected therein and the screen display orientation of the display unit 14.

Thus, when the finger of the user is used as the operation medium without using the electronic pen 30, the laptop PC 1 according to the present embodiment can use a touch device with the finger to touch on the screen to easily display an appropriate icon menu corresponding to the use state and the display area, and hence an appropriate application corresponding to the use state and the display area can be started quickly.

Further, the laptop PC 1 according to the present embodiment includes the setting processing unit 114 to change menu information (setting information) stored in the settings menu storage unit 41 according to a request from the user.

Thus, the laptop PC 1 according to the present embodiment can display an appropriate icon menu customized according to the request from the user. Therefore, since the laptop PC 1 according to the present embodiment can customize the icon menu for each user, convenience can further be improved.

Further, the laptop PC 1 according to the present embodiment includes the display unit 14 having display areas, the touch sensor unit 33, and the startup control unit 115. The touch sensor unit 33 detects the position of the operation medium (electronic pen 30) as the pen-like operation medium on the screen of the display unit 14, and a touch of the pen-like operation medium on the screen to detect the touch of the pen-like operation medium on the screen. The touch sensor unit 33 also detects that the pen-like operation medium has approached within the predetermined distance to the screen of the display unit 14, and when the pen-like operation medium has approached within the predetermined distance to the screen, the touch sensor unit 33 can detect (i.e. sense) the position of the pen-like operation medium above the screen in a non-contact manner. When using the touch sensor unit 33 to detect (i.e. sense), as the predetermined operation, an operation (hovering operation) to keep the state where the pen-like operation medium is stopped within the predetermined distance to the screen for the certain period of time, the startup control unit 115 displays a menu of icons in a display area in which the pen-like operation medium is detected. The startup control unit 115 starts an application program corresponding to an icon selected with a touch of the pen-like operation medium from among the displayed icons in the menu.

Thus, the laptop PC 1 according to the present embodiment can easily display an icon menu to select and start an application, for example, by the user executing a hovering operation above the screen with the pen-like operation medium (for example, the electronic pen 30). Therefore, the laptop PC 1 according to the present embodiment can simplify the operation to start the application, and hence the application can be started quickly.

Further, a control method according to the present embodiment is a control method for the laptop PC 1 including the display unit 14 having two or more display areas, and the touch sensor unit 33 which detects the position of the operation medium on the screen of the display unit 14 and a touch of the operation medium on the screen, the control method including a menu display step and an application startup step. In the menu display step, when the predetermined operation is executed on the screen with the operation medium, the startup control unit 115 displays, in a display area with the operation medium detected therein, a menu of icons different depending on the display area with the operation medium detected therein among the two or more display areas and the screen display orientation of the display unit 14. In the application startup step, the startup control unit 115 starts, in the display area with the operation medium detected therein, an application program corresponding to an icon selected with a touch of the operation medium from among the displayed icons in the menu.

Thus, the control method according to the present embodiment has the same effect as the laptop PC 1 according to the present embodiment described above, which can simplify the operation to start the application, and hence can start the application quickly.

Further, the control method according to the present embodiment is a control method for the laptop PC 1 including the display unit 14 having display areas, the touch sensor unit 33 described above, and the touch sensor unit 33 which can detect that the pen-like operation medium has approached within the predetermined distance to the screen of the display unit 14, and when the pen-like operation medium has approached within the predetermined distance to the screen, which can detect the position of the pen-like operation medium above the screen in a non-contact manner, the control method includes a menu display step and an application startup step. In the menu display step, when using the touch sensor unit 33 to detect, as the predetermined operation, an operation to keep a state where the pen-like operation medium is stopped within the predetermined distance to the screen for the certain period of time, the startup control unit 115 displays a menu of icons in a display area with the pen-like operation medium detected therein. In the application startup step, the startup control unit 115 starts an application program corresponding to an icon selected with a touch of the pen-like operation medium from among the displayed icons in the menu.

Thus, the control method according to the present embodiment has the same effect as the laptop PC 1 according to the present embodiment described above, which can simplify the operation to start the application, and hence can start the application quickly.

Second Embodiment

Next, a laptop PC 1a according to a second embodiment will be described with reference to the accompanying drawings.

Figures 13, 14:
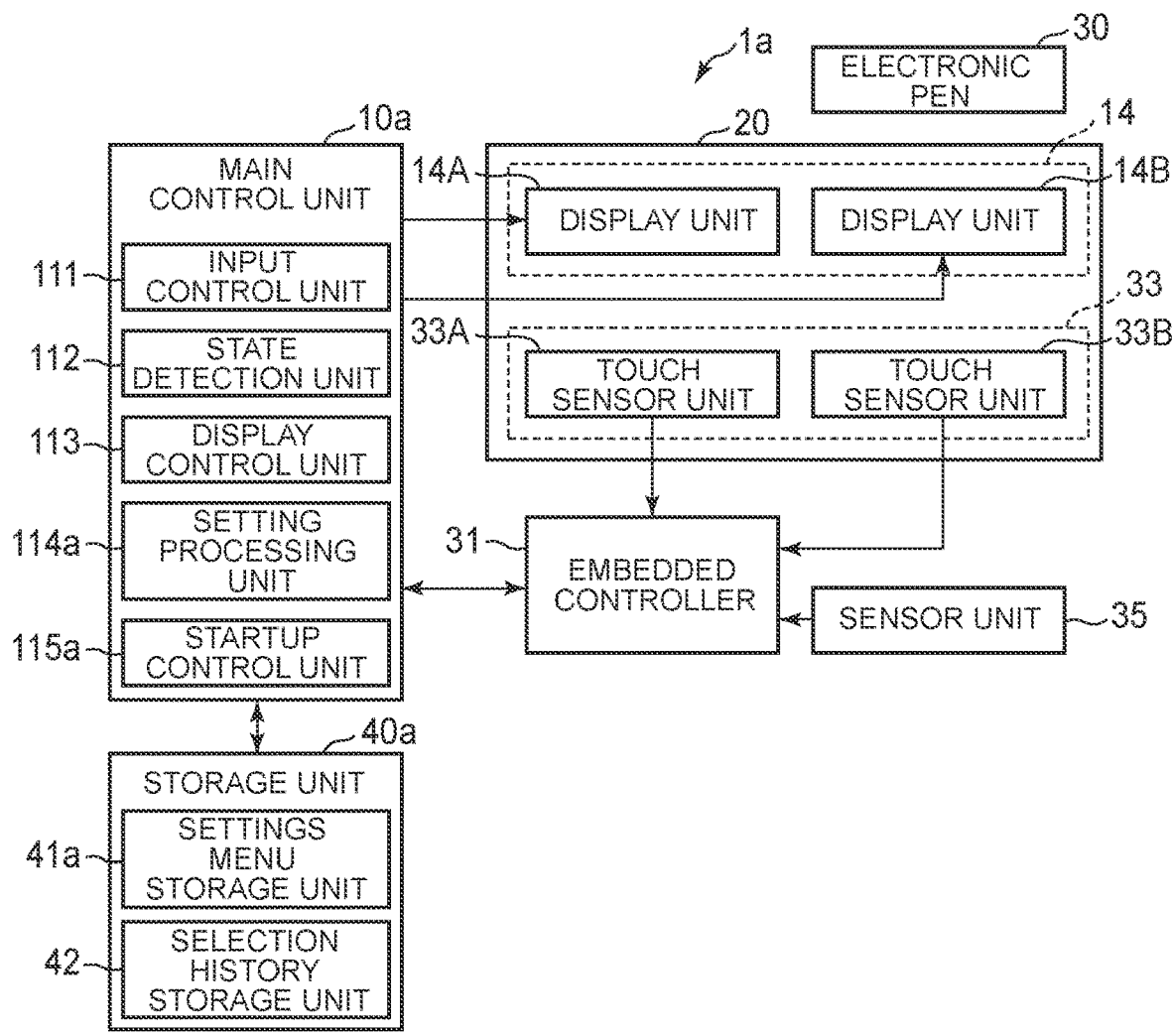
FIG. 13 is a block diagram illustrating an example of the functional configuration of a laptop PC.
FIG. 14 is a table illustrating a data example of a settings menu storage unit.

FIG. 13 is a block diagram illustrating an example of the functional configuration of the laptop PC 1a according to the second embodiment.

In the present embodiment, a modification to change the icon menu depending on the time slot to use will be described.

Note that since the appearance and hardware configuration of the laptop PC 1a according to the second embodiment are the same as those of the first embodiment illustrated in FIG. 1 and FIG. 2 described above, the description thereof will be omitted here.

As illustrated in FIG. 13, the laptop PC 1a includes a main control unit 10a, the touch screen 20, the electronic pen 30, the embedded controller 31, the sensor unit 35, and a storage unit 40a.

In FIG. 13, the same components as those in FIG. 3 described above are given the same reference numerals to omit the description thereof here.

The storage unit 40a is, for example, a storage unit realized by the HDD 23, which includes a settings menu storage unit 41a and the selection history storage unit 42.

The settings menu storage unit 41a stores setting information on each menu of icons indicative of applications (hereinafter called an icon menu). The settings menu storage unit 41a stores, as setting information, a content of the icon menu to be displayed upon application startup processing. Referring here to FIG. 14, a data example of the settings menu storage unit 41a will be described.

FIG. 14 is a table illustrating a data example of the settings menu storage unit 41a in the present embodiment.

As illustrated in FIG. 14, the settings menu storage unit 41a stores display modes, display areas, time slots, and menu information (applications) in association with one another.

The settings menu storage unit 41a is different from that of the first embodiment described above in that data is stored in association with the time slots.

In this table, the time slots are time slots in which the laptop PC 1a is used, and menu information (applications) in the settings menu storage unit 41a in the present embodiment can be changed depending on the time slot.

For example, in the example illustrate in FIG. 14, it is indicated that, when the display mode is "clamshell" and the display area is "B cover area," menu information (setting information) in a time slot from "9:00 to 12:00" is "C word processor," "B email software," "A browser," . . . . Further, it is indicated that menu information (setting information) in a time slot from "12:00 to 13:00" is "A browser," "B email software," "C word processor," . . . .

Returning to the description of FIG. 13, the main control unit 10a is a functional unit implemented by the CPU 11 and the chipset 21 executing programs stored in the main memory 12 to execute various processing based on the OS. The main control unit 10a includes, for example, the input control unit 111, the state detection unit 112, the display control unit 113, a setting processing unit 114a, and a startup control unit 115a.

The setting processing unit 114a is a functional unit to set setting information of each icon menu so as to store the setting information of the icon menu in the settings menu storage unit 41a according to a request from the user. The setting processing unit 114a registers and changes the setting information in the settings menu storage unit 41a, for example, as illustrated in FIG. 14 according to the request from the user.

The startup control unit 115a executes processing to start an application using the icon menu. Since the basic functionality of the startup control unit 115a is the same as that of the startup control unit 115 of the first embodiment described above, only a function different from that of the startup control unit 115 will be described here.

The startup control unit 115a changes the menu of icons to be displayed according to the time at which the predetermined operation was executed.

For example, when the hovering operation of the electronic pen 30 is detected through the input control unit 111, the startup control unit 115a displays, in a display area with the electronic pen 30 detected therein, an icon menu different depending on the display area with the electronic pen 30 detected therein, the screen display orientation of the display unit 14, and the time slot. For example, the startup control unit 115a refers to the settings menu storage unit 41a to acquire menu information (setting information) corresponding to the time slot in which the hovering operation was detected so as to display an icon menu based on the acquired menu information (setting information).

Figure 15:
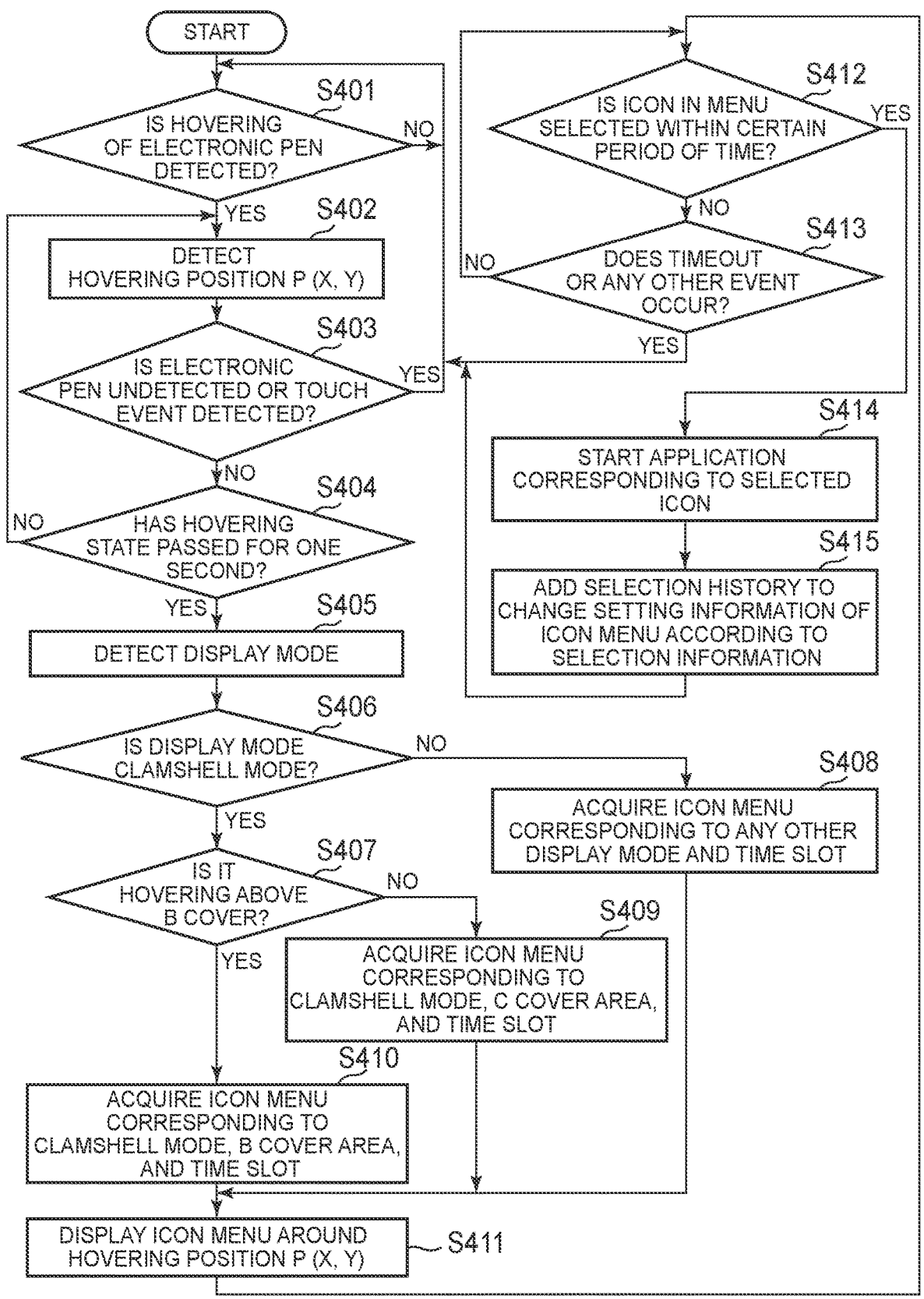
FIG. 15 is a flowchart illustrating an example of application startup processing of the laptop PC.

Referring next to FIG. 15, application startup processing of the laptop PC 1a according to the present embodiment will be described.

FIG. 15 is a flowchart illustrating an example of application startup processing of the laptop PC 1a according to the present embodiment.

In FIG. 15, since processes from step S401 to step S407 are the same as the processes from step S201 to step S207 illustrated in FIG. 11 described above, the description thereof will be omitted here.

In step S408, the startup control unit 115a acquires an icon menu corresponding to any other display mode (book mode/tablet mode) and the time slot. For example, the startup control unit 115a acquires, from the settings menu storage unit 41a, menu information (setting information) corresponding to the display mode, the right area or the left area, and the time slot. After the process of step S408, the startup control unit 115a proceeds to step S411.

Further, in step S409, the startup control unit 115a acquires an icon menu corresponding to the clamshell mode, the C cover area, and the time slot. The startup control unit 115a acquires, from the settings menu storage unit 41a, menu information (setting information) corresponding to the clamshell mode, the C cover area, and the time slot. After the process of step S409, the startup control unit 115a proceeds to step S411.

Further, in step S410, the startup control unit 115a acquires an icon menu corresponding to the clamshell mode, the B cover area, and the time slot. The startup control unit 115a acquires, from the settings menu storage unit 41a, menu information (setting information) corresponding to the clamshell mode, the B cover area, and the time slot. After the process of step S410, the startup control unit 115a proceeds to step S411.

Since processes from step S411 to step S414 are the same as the processes from step S211 to step S214 illustrated in FIG. 11 described above, the description thereof will be omitted here.

In step S415, the startup control unit 115a adds a selection history to change the setting information of the icon menu according to selection information. The startup control unit 115a adds, to the selection history storage unit 42, a selection history corresponding to a selected icon as illustrated in FIG. 5. Further, based on the selection history stored in the selection history storage unit 42, the startup control unit 115a sums up the selection frequency of each icon in each time slot to change the setting information (menu information) of the settings menu storage unit 41a so as to preferentially display an application corresponding, for example, to an icon having a higher selection frequency. After the process of step S415, the startup control unit 115a returns to step S401.

As described above, in the laptop PC 1a according to the present embodiment, the startup control unit 115a changes the menu of icons to be displayed according to the time at which the predetermined operation was executed.

Thus, for example, the laptop PC 1a according to the present embodiment can display an icon menu suitable for work in a time slot at work and display an icon menu suitable for private time in a private time slot during a break or after returning home. Therefore, the laptop PC 1a according to the present embodiment can simplify an operation to start an application, and can quickly start an appropriate application according to the time slot.

Third Embodiment

Next, a laptop PC 1b according to a third embodiment will be described with reference to the accompanying drawings.

Figures 16, 17:
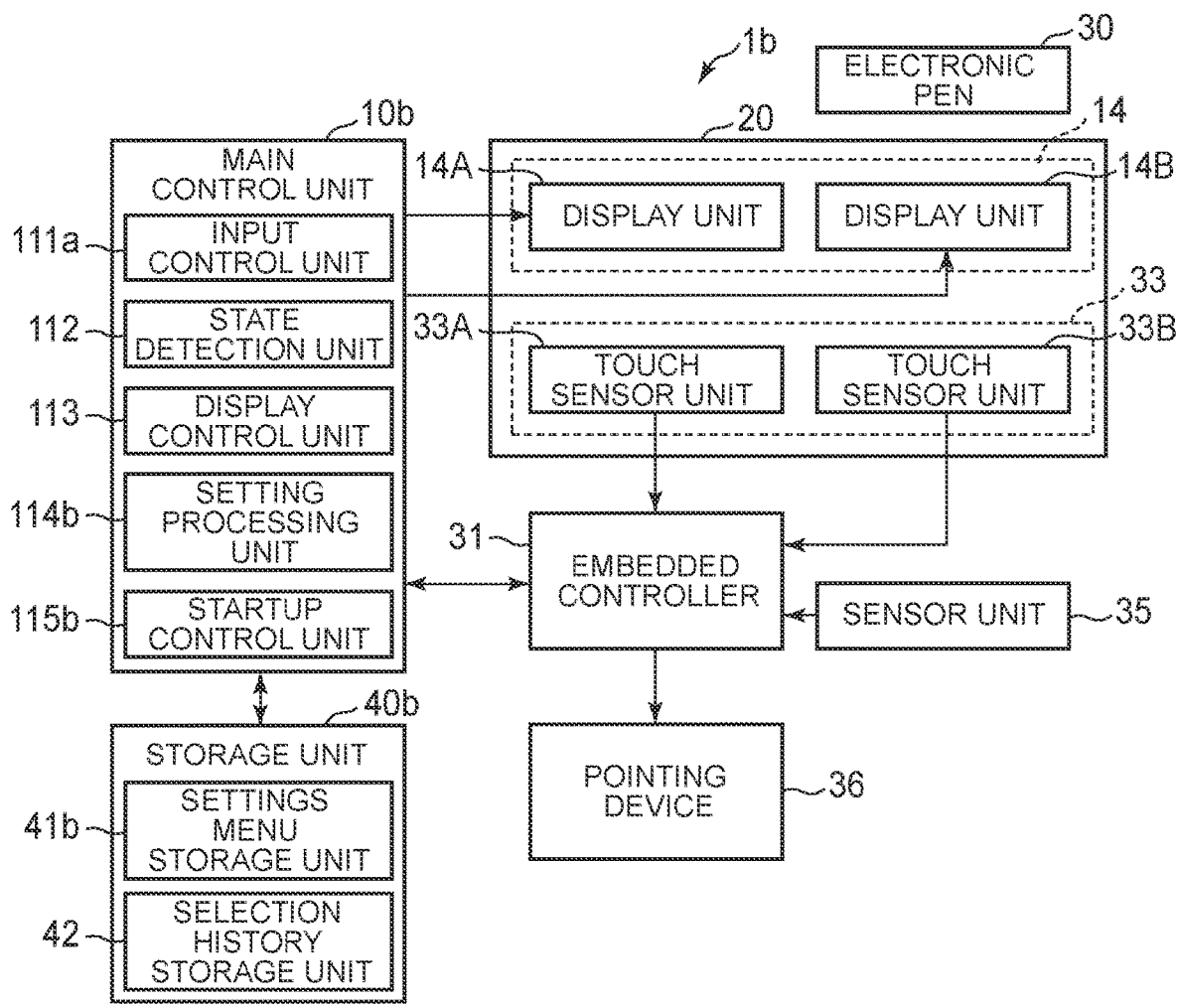
FIG. 16 is a block diagram illustrating an example of the functional configuration of a laptop PC.
FIG. 17 is a table illustrating a data example of a settings menu storage unit.

FIG. 16 is a block diagram illustrating an example of the functional configuration of the laptop PC 1b according to the third embodiment.

In the present embodiment, a modification to change the icon menu according to different types of operation mediums and a pointing device will be described.

Note that since the appearance and hardware configuration of the laptop PC 1b according to the third embodiment are basically the same as those of the first embodiment illustrated in FIG. 1 and FIG. 2 described above, the description thereof will be omitted here. In the present embodiment, a pointing device 36 is added.

As illustrated in FIG. 16, the laptop PC 1b includes a main control unit 10b, the touch screen 20, the electronic pen 30, the embedded controller 31, the sensor unit 35, the pointing device 36, and a storage unit 40b.

In FIG. 16, the same components as those in FIG. 3 described above are given the same reference numerals to omit the description thereof here.

The pointing device 36 is, for example, a mouse or a touch pad, which is a pointing input device different from the touch screen 20.

The storage unit 40b is a storage unit realized, for example, by the HDD 23, which includes a settings menu storage unit 41b and the selection history storage unit 42.

The settings menu storage unit 41b stores setting information of a menu of icons indicative of applications (hereinafter called an icon menu). The settings menu storage unit 41b stores, as setting information, a content of the icon menu to be displayed upon application startup processing. Referring here to FIG. 17, a data example of the settings menu storage unit 41b will be described.

FIG. 17 is a table illustrating a data example of the settings menu storage unit 41b in the present embodiment.

As illustrated in FIG. 17, the settings menu storage unit 41b stores display modes, display areas, operation mediums/devices, and menu information (applications) in association with one another.

Here, the operation mediums/devices indicate the types of operation mediums such as the electronic pen 30 and a finger of the user, and types of input devices such as the mouse and the touch pad.

The settings menu storage unit 41b is different from that in the first embodiment described above in that data is stored in association with the operation mediums/devices. The settings menu storage unit 41b in the present embodiment can change the menu information (applications) according to the operation medium/device.

For example, in the example illustrated in FIG. 17, when the display mode is "clamshell" and the display area is "B cover area," it is indicated that menu information (setting information) in a case where the operation medium/device is "electronic pen" is "C word processor," "B email software," "A browser," . . . . Further, it is indicated that menu information (setting information) in a case where the operation medium/device is "finger" is "A browser," "B email software," "C word processor," . . . . Further, it is indicated that menu information (setting information) in a case where the operation medium/device is "touch pad" is "C word processor," "B email software," "A browser," . . . .

Returning to the description of FIG. 16, the main control unit 10b is a functional unit implemented by the CPU 11 and the chipset 21 executing programs stored in the main memory 12 to execute various processing based on the OS. The main control unit 10b includes, for example, the input control unit 111a, the state detection unit 112, the display control unit 113, a setting processing unit 114b, and a startup control unit 115b.

The setting processing unit 114b is a functional unit to set setting information of each icon menu so as to store the setting information of the icon menu in the settings menu storage unit 41b according to a request from the user. The setting processing unit 114b registers and changes the setting information in the settings menu storage unit 41b, for example, as illustrated in FIG. 17 according to the request from the user.

The startup control unit 115b executes processing to start an application using the icon menu. Since the basic functionality of the startup control unit 115b is the same as that of the startup control unit 115 of the first embodiment described above, only a function different from that of the startup control unit 115 will be described here.

In the present embodiment, the operation mediums include two or more different types of operation mediums (such as the electronic pen 30 and a finger of the user), and predetermined operations include different types of predetermined operations. For example, predetermined operations with a finger of the user include operations such as to keep the finger stopped for the certain period of time while touching on the screen, and to tap on the screen with the finger plural times.

The startup control unit 115b displays an icon menu different depending on the type of operation medium or type of predetermined operation executed.

For example, when the hovering operation (first predetermined operation) of the electronic pen 30 is detected through the input control unit 111, the startup control unit 115b displays, in a display area with the electronic pen 30 detected therein, an icon menu different depending on the display area with the electronic pen 30 detected therein, the screen display orientation of the display unit 14, and the operation medium/input device (pointing device). For example, the startup control unit 115b refers to the settings menu storage unit 41b to acquire menu information (setting information) corresponding to the electronic pen 30 so as to display an icon menu based on the acquired menu information (setting information).

Further, when a second predetermined operation different from the hovering operation (first predetermined operation) is executed on the screen by the pointing device 36, the startup control unit 115b displays, in a display area with the second predetermined operation detected therein, an icon menu different from that when the hovering operation (first predetermined operation) is executed. Here, the second predetermined operation is, for example, an operation to point to a display area using the touch pad and press a right button.

When the second predetermined operation with the pointing device 36 is detected, the startup control unit 115b refers to the settings menu storage unit 41b to acquire menu information (setting information) corresponding, for example, to the touch pad (pointing device 36) so as to display an icon menu based on the acquired menu information (setting information).

Further, when an application corresponding to a selected icon is started, the startup control unit 115b adds a selection history to change setting information of the icon menu according to selection information. The startup control unit 115b adds, to the selection history storage unit 42, the selection history corresponding to the selected icon. On this occasion, the type of operation medium or input device may also be included in the selection history.

Further, based on the selection history stored in the selection history storage unit 42, the startup control unit 115b sums up the selection frequency of each icon for each type of operation medium or input device to change the setting information (menu information) of the settings menu storage unit 41b so as to preferentially display an application corresponding, for example, to an icon having a higher selection frequency.

As described above, in the laptop PC 1b according to the present embodiment, plural operation mediums different in type (for example, the electronic pen 30, the finger of the user, and the like) are included in the operation mediums. In the predetermined operations, predetermined operations different in type (for example, the hovering operation, the operation to touch the screen with the finger for the certain period of time, and the like) are included. The startup control unit 115b displays a menu of icons different depending on the type of operation medium, or the type of predetermined operation executed.

Thus, the laptop PC 1b according to the present embodiment can display icon menus different, for example, between the electronic pen 30 and the finger of the user, and can display an icon menu different depending on the hovering operation or the touch operation with the finger. Therefore, the laptop PC 1b according to the present embodiment can simplify an operation to start an application, and can quickly start an appropriate application according to the operation medium or the predetermined operation.

Further, in the present embodiment, the hovering operation is the first predetermined operation, and the laptop PC 1b further includes the pointing device 36 different from the touch sensor unit 33. When a second predetermined operation (for example, an operation to press the right button of the touch pad by using the pointing device 36 or the like) different from the first predetermined operation (hovering operation) is executed on the screen by using the pointing device 36, the startup control unit 115b displays, in a display area with the second predetermined operation detected therein, a menu of icons different from the case when the first predetermined operation is executed.

Thus, since the laptop PC 1b according to the present embodiment displays a menu of icons different depending on the predetermined operation (second predetermined operation) using the pointing device 36 different from the touch sensor unit 33, an appropriate application according to the input device and the predetermined operation can be started quickly.

Note that the present disclosure is not limited to each of the aforementioned embodiments, and changes are possible without departing from the scope of the present disclosure. Accordingly, the scope of the invention should be limited only by the attached claims.

For example, in each of the aforementioned embodiments, the example in which the information processing apparatus is the laptop PC 1 (1a, 1b) is described, but the present disclosure is not limited to this example. For example, the information processing apparatus may also be any other information processing apparatus such as a tablet terminal, a desktop PC, a smartphone, or the like.

Further, in each of the aforementioned embodiments, the example in which the laptop PC 1 (1a, 1b) includes the settings menu storage unit 41 (41a, 41b) and the selection history storage unit 42 is described, but the present disclosure is not limited to this example. For example, a server apparatus on a network may include either or both of the settings menu storage unit 41 (41a, 41b) and the selection history storage unit 42. By having the server apparatus include either or both of the settings menu storage unit 41 (41a, 41b) and the selection history storage unit 42, the same icon menu can be displayed on two or more information processing apparatuses, and hence convenience can further be improved.

Further, in each of the aforementioned embodiments, the example in which the startup control unit 115 (115a, 115b) displays a common (identical) icon menu both in the left area and in the right area of the book mode is described, but different icon menus may also be displayed based on the menu information stored in the settings menu storage unit 41 (41a, 41b).

Further, in each of the aforementioned embodiments, the example in which the display unit 14 includes two display units, that is, the display unit 14A and the display unit 14B, is described, but three or more display units and display areas may also be included. Further, the display unit 14 may be one display unit including two or more display areas.

Further, in each of the aforementioned embodiments, the example in which the display modes are the clamshell mode and the book mode/tablet mode is described, but the present disclosure is not limited to this example. For example, the present disclosure may also be applied to any other display mode such as a tent mode in which the display surfaces are folded outward. In other words, the laptop PC 1 (1a, 1b) may also change the content of the icon menu according to the display modes including any other display mode.

Note that each configuration of the laptop PC 1 (1a, 1b) described above has a computer system therein. Then, a program for implementing the function of each component included in the laptop PC 1 (1a, 1b) described above may be recorded on a computer-readable recording medium so that the program recorded on this recording medium is read into the computer system and executed to perform processing in each component included in the laptop PC 1 (1a, 1b) described above. Here, the fact that "the program recorded on the recording medium is read into the computer system and executed" includes installing the program on the computer system. It is assumed that the "computer system" here includes the OS and hardware such as peripheral devices and the like.

Further, the "computer system" may also include two or more computers connected through a network including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. Thus, the recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the laptop PC 1 (1a, 1b), or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the above-described functions may be realized as an integrated circuit such as LSI (Large Scale Integration). Each of the functions may be implemented as a processor individually, or part or the whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

The invention claimed is:

1. An information processing apparatus comprising:
    a display unit having a plurality of display areas that include a first display area disposed on a first chassis and a second display area disposed on a second chassis;
    a rotation mechanism that allows the first chassis to rotate relative to the second chassis while coupling the first chassis to the second chassis;
    a touch sensor unit that detects a predetermined operation by an operation medium on one of the plurality of display areas and to detect a position of the operation medium during the predetermined operation; and
    a startup control unit that displays a menu of icons in the plurality of display areas upon the touch sensor unit sensing the predetermined operation, the menu of icons being different depending on a combination of:
        an orientation of the display unit, and
        which of the plurality of display areas the predetermined operation occurred in, wherein
    the startup control unit launches an application program corresponding to an icon selected by the operation medium from the displayed menu of icons, and
    depending on an orientation of a rotation axis of the rotation mechanism relative to an orientation of contents displayed on the display unit, the startup control unit displays one of a group consisting of:
        different menus of icons depending on which of the plurality of display areas the predetermined operation occurred in; and
        the same menu of icons regardless of which of the plurality of display areas the predetermined operation occurred in.

2. The information processing apparatus according to claim 1, wherein the startup control unit changes the menu of icons to be displayed according to a selection history of the icons selected in the past.

3. The information processing apparatus according to claim 1, wherein the startup control unit changes the menu of icons to be displayed according to a time at which the predetermined operation was executed.

4. The information processing apparatus according to claim 1, wherein
    the operation medium is a pen-like operation medium, and
    the predetermined operation is a hover operation by the pen-like operation medium for at least a predetermined amount of time.

5. The information processing apparatus according to claim 4, wherein
    the pen-like operation medium is an electronic pen including a resonant circuit, and
    the touch sensor unit detects, by electromagnetic induction, the hover operation and the position of the electronic pen.

6. The information processing apparatus according to claim 1, wherein
    the operation medium is a finger of a user.

7. A control method for an information processing apparatus including: a display unit having a plurality of display areas that include a first display area disposed on a first chassis and a second display area disposed on a second chassis; a rotation mechanism that allows the first chassis to rotate relative to the second chassis while coupling the first chassis to the second chassis; and a touch sensor unit that detects a predetermined operation by an operation medium on one of the plurality of display areas and to detect a position of the operation medium during the predetermined operation, the control method comprising:
    displaying a menu of icons in the plurality of display areas upon the touch sensor unit sensing the predetermined operation, the menu of icons being different depending on a combination of:
        an orientation of the display unit, and
        which of the plurality of display areas the predetermined operation occurred in; and
    launching an application program corresponding to an icon selected by the operation medium from the displayed menu of icons, wherein
    depending on an orientation of a rotation axis of the rotation mechanism relative to an orientation of contents displayed on the display unit, the information processing apparatus displays one of a group consisting of:
        different menus of icons depending on which of the plurality of display areas the predetermined operation occurred in; and
        the same menu of icons regardless of which of the plurality of display areas the predetermined operation occurred in.

* * * * *